US012775790B2

(12) United States Patent
Choladze et al.

(10) Patent No.: US 12,775,790 B2
(45) Date of Patent: Oct. 27, 2026

(54) DIALOGUE STATE TRACKING LOGIC CONTROL LAYERS

(71) Applicant: Augmented Reality Concepts, Inc., Syracuse, NY (US)

(72) Inventors: David Dachi Choladze, Tbilisi (GE); Zaal Gachechiladze, Tbilisi (GE); Guram Dentoshvili, Tbilisi (GE); Ana Kolkhidashvili, Tbilisi (GE); Mariam Matiashvili, Tbilisi (GE); Sophio Tchkoidze, Tbilisi (GE)

(73) Assignee: Augmented Reality Concepts, Inc., Syracuse, NY (US)

( * ) Notice: Subject to any disclaimer, the term of this patent is extended or adjusted under 35 U.S.C. 154(b) by 136 days.

(21) Appl. No.: 18/640,417

(22) Filed: Apr. 19, 2024

(65) Prior Publication Data

US 2025/0328727 A1 Oct. 23, 2025

(51) Int. Cl.
*G06F 40/20* (2020.01)

(52) U.S. Cl.
CPC .................................... *G06F 40/20* (2020.01)

(58) Field of Classification Search
CPC . G10L 15/22; G10L 15/063; G10L 2015/223; G10L 17/22; G10L 15/10; G10L 17/02; G06F 16/583; G06F 16/3347; G06F 9/3017; G06F 3/165
See application file for complete search history.

(56) References Cited

U.S. PATENT DOCUMENTS

| | | | | |
|---|---|---|---|---|
| 10,540,976 | B2 * | 1/2020 | Van Os | G06F 3/167 |
| 11,030,418 | B2 * | 6/2021 | Nakao | G06F 40/216 |
| 11,115,353 | B1 * | 9/2021 | Crowley | G06F 40/284 |
| 11,183,170 | B2 * | 11/2021 | Iwase | G10L 15/22 |
| 11,368,420 | B1 | 6/2022 | Crook et al. | |
| 11,373,650 | B2 * | 6/2022 | Suzuki | G06F 3/14 |
| 11,381,529 | B1 * | 7/2022 | Matthews | G06Q 30/016 |
| 11,688,268 | B2 * | 6/2023 | Saito | G10L 15/22 704/231 |
| 12,002,458 | B1 * | 6/2024 | Gao | G10L 15/22 |

(Continued)

FOREIGN PATENT DOCUMENTS

| | | | | |
|---|---|---|---|---|
| CN | 1842787 B | * | 12/2011 | G06F 40/58 |
| CN | 103049433 A | * | 4/2013 | G06N 5/02 |

(Continued)

*Primary Examiner* — Mohammad K Islam
(74) *Attorney, Agent, or Firm* — FisherBroyles, LLP

(57) ABSTRACT

An inquiry is received by a conversational artificial intelligence (AI) agent while the conversational AI agent is in a first dialogue state. The conversational AI agent classifies the inquiry to generate a classified inquiry and extracts one or more parameters from the classified inquiry. Next, the conversational AI agent determines a second dialogue state to transition to from the first dialogue state based at least on the extracted parameters. Also, the conversational AI agent determines one or more response outputs to generate based at least on the extracted parameters and based at least on the second dialogue state. Then, the conversational AI agent generates, based at least on the one or more response outputs, one or more electronic messages to be conveyed to a computing device to be displayed to a user, where the one or more electronic messages are in response to the inquiry.

13 Claims, 18 Drawing Sheets

(56) References Cited

U.S. PATENT DOCUMENTS

| | | | | |
|---|---|---|---|---|
| 12,142,298 | B1 * | 11/2024 | Kottur | G06F 40/35 |
| 2008/0201135 | A1 * | 8/2008 | Yano | G10L 15/1822 704/E15.001 |
| 2013/0325759 | A1 * | 12/2013 | Rachevsky | G06V 10/764 706/12 |
| 2015/0066479 | A1 * | 3/2015 | Pasupalak | G06F 16/90332 704/9 |
| 2015/0279360 | A1 * | 10/2015 | Mengibar | G06F 40/205 704/257 |
| 2019/0122661 | A1 * | 4/2019 | Hansen | G10L 15/22 |
| 2019/0172444 | A1 * | 6/2019 | Hiroe | G10L 15/10 |
| 2020/0193265 | A1 | 6/2020 | Hill et al. | |
| 2020/0335104 | A1 | 10/2020 | Lu | |
| 2021/0303605 | A1 * | 9/2021 | He | G06N 5/02 |
| 2022/0093101 | A1 * | 3/2022 | Krishnan | G06V 40/20 |
| 2022/0188361 | A1 * | 6/2022 | Botros | G06F 40/274 |
| 2022/0284904 | A1 * | 9/2022 | Pu | G06F 40/35 |
| 2022/0301566 | A1 * | 9/2022 | Van Os | G10L 15/26 |
| 2022/0350605 | A1 * | 11/2022 | Iwase | G06F 3/011 |
| 2022/0374605 | A1 * | 11/2022 | Sethi | G06F 1/3209 |
| 2022/0415320 | A1 * | 12/2022 | Zheng | G06F 40/237 |
| 2023/0177581 | A1 * | 6/2023 | Ren | G06Q 30/0282 705/26.7 |
| 2023/0409615 | A1 * | 12/2023 | Khemka | G06V 20/68 |
| 2023/0419952 | A1 * | 12/2023 | Desai | G06F 40/35 |
| 2024/0412720 | A1 * | 12/2024 | Vasylyev | G06F 16/90332 |

FOREIGN PATENT DOCUMENTS

| | | | | | |
|---|---|---|---|---|---|
| CN | 110309850 | A | * | 10/2019 | G06N 5/02 |
| CN | 110609891 | B | * | 6/2021 | G06N 3/044 |
| CN | 113392288 | A | * | 9/2021 | G06N 3/045 |
| CN | 114154516 | A | * | 3/2022 | G06F 40/35 |
| CN | 111460121 | B | * | 7/2022 | G06N 20/00 |
| JP | WO2006040971 | A1 | * | 5/2008 | G06F 40/58 |
| TW | I311265 | B | * | 6/2009 | A63F 13/35 |
| WO | WO2006040971 | A1 | * | 11/2019 | G10L 13/10 |
| WO | WO-2021106080 | A1 | * | 6/2021 | G10L 13/10 |

* cited by examiner

DIALOGUE STATE TRACKING LOGIC CONTROL LAYERS

TECHNICAL FIELD

The present disclosure generally relates to maintaining dialogue state tracking logic control layers for a conversational artificial intelligence framework.

BACKGROUND

Organizations increasingly need to manage large numbers of queries by customers. Automating the handling of queries can save costs and lead to more desirable outcomes. However, automating the responses to customer queries can be challenging. Systems based on artificial intelligence that handle queries by imitating human conversations often struggle to properly respond to user queries that are expressed in a natural language. These user queries may include jargon, have typos, and so on. Generated responses to these natural language user queries can easily end up off-topic and lead to customer dissatisfaction.

SUMMARY

In some implementations, a conversational artificial intelligence (AI) agent is configured to receive customer inquiries and to generate responses to the customer inquiries. In an example, an inquiry is received by the conversational AI agent while the conversational AI agent is in a first dialogue state. In response to receiving the inquiry, the conversational AI agent classifies the inquiry, and the conversational AI agent extracts one or more parameters from the classified inquiry. Also, the conversational AI agent determines a second dialogue state to transition to from the first dialogue state based at least on the one or more parameters extracted from the classified inquiry. Next, the conversational AI agent determines one or more response outputs to generate based on the one or more parameters and based on the second dialogue state. Then, the conversational AI agent determines one or more electronic messages to generate based on the one or more response outputs. Finally, the conversational AI agent generates the one or more electronic messages to be conveyed, via one or more communication networks, to a computing device to be displayed to a user, where the one or more electronic messages are in response to the inquiry.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
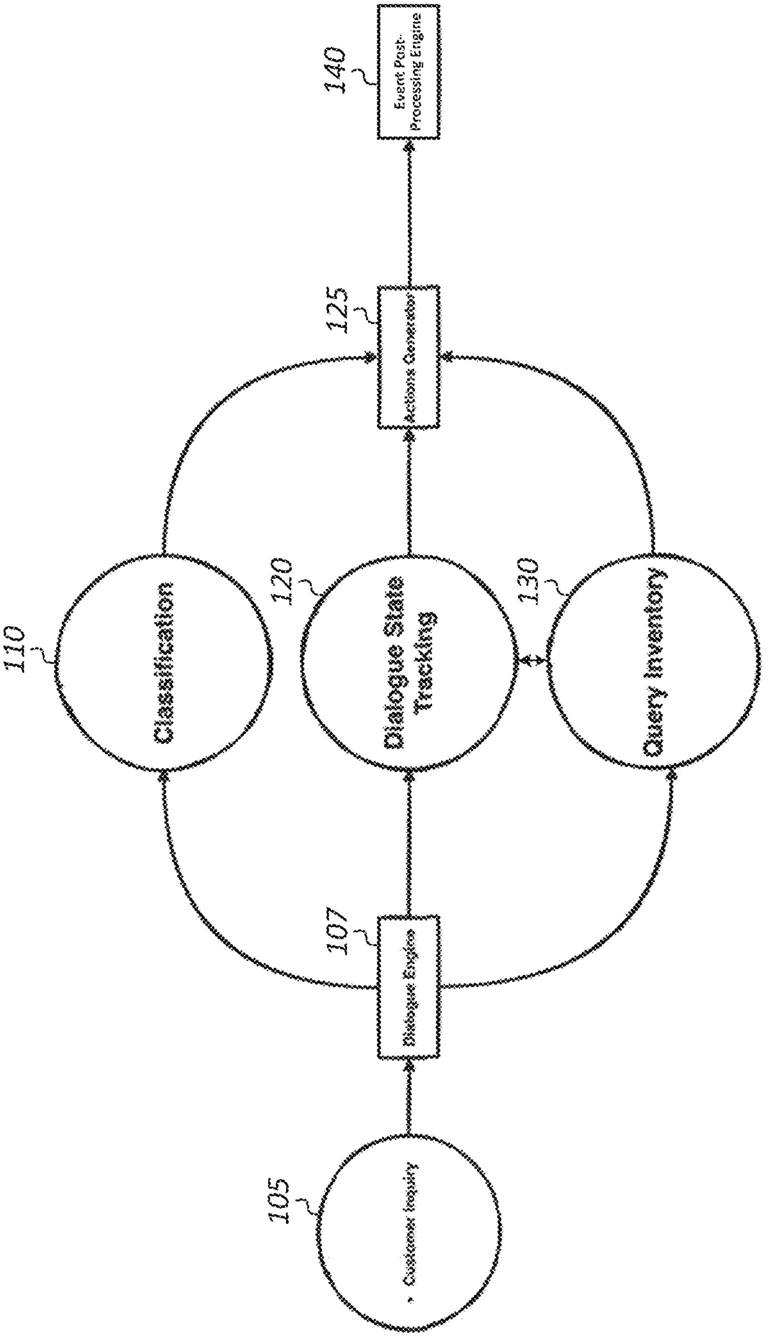
FIG. 1 illustrates a logical diagram of an example of a dialogue state tracking system, in accordance with some example implementations of the current subject matter.

FIG. 1 illustrates an example of a dialogue state tracking system 100, in accordance with some implementations of the current subject matter. A customer inquiry 105 may be generated by a potential customer and then provided to system 100 via any of various lead platforms. The inquiry may occur based on the customer's own initiative, or in response to targeted sales or marketing outreach. A new conversation may be initiated in response to system 100 receiving customer inquiry 105, or an existing conversation may be augmented in response to system 100 receiving customer inquiry 105. For example, when the customer inquiry 105 comes into the system 100, system 100 analyzes the incoming message and the meta information that comes with the lead and generates a response based on the customer's interest and the customer's question, and then sends out an outgoing message. The customer may respond to the outgoing message with a response or another question, which system 100 will analyze and respond to, with more messages sent back and forth for as long as the customer continues the conversation. It is noted that customer inquiry 105 may also be referred to as a data request, a data input, an electronic data input, a query, or the like.

System 100 may include multiple components and utilize any of various techniques to analyze and process incoming customer inquiries. In an example, the customer inquiry 105 is processed by dialogue engine 107, with dialogue engine 107 interpreting the input data and passing an interpretation result to a classification engine 110. The classification engine 110 determines the customer topic and the details of the customer inquiry 105 based on the interpretation result. In an example, the classification engine 110 determines what the customer inquiry 105 pertains to in terms of subject matter. In another example, the classification engine 110 determines how many questions are in customer inquiry 105.

Additionally, a dialogue state tracking engine 120 maintains the context of the conversation while also managing the flow of the conversation. If specific inventory-related information is needed as part of managing the flow of the conversation, the dialogue state tracking engine 120 retrieves necessary data from the relevant inventory feed via inventory query engine 130. The inventory feed provides information about the inventory that is for sale and about which the customer is inquiring.

For example, the customer inquiry 105 may be related to a vehicle, and the customer may be browsing a web page that is specific to a particular vehicle, and so in this case, the inquiry is linked to this particular vehicle. This linkage may be denoted by one or more identifiers (IDs) which allow system 100 to access the appropriate data in the inventory feed. On the page which the customer is browsing, there may be a lead form that the customer fills in, with their phone number, email address, their question, and so on. Sometimes questions are pre-populated, or at least partially pre-populated. An example question might be: "Is this car still available?" Additional questions may include: "What is the mileage for this car?", "Does the car have any damage history?", "Does the car come with an entertainment system", and so on.

The inventory query engine 130 retrieves information from the inventory feed based on the customer's interactions. For example, if the customer inquiry 105 is the following: "Do you have a 2024 Ford Mustang for sale?", inventory query engine 130 may query the inventory feed to determine whether a 2024 Ford Mustang is available. The customer may follow up with additional questions, such as the price, mileage (if the car is used), color, and other details related to their initial query. Inventory query engine 130 may query the inventory feed for the follow-up questions. Inventory query engine 130 may also retrieve information regarding specific items for sale in a pre-emptive manner, and store the information in a fast memory to be able to respond to follow-on questions without having to retrieve additional data from the inventory feed.

Actions generator module 125 decides on the next steps to take in response to the customer's request. Also, any post-interaction events or follow-ups are managed by the event post-processing engine 140, ensuring a coherent end-to-end experience. For example, if at the end of the conversation, an appointment is to be scheduled, event post-processing engine 140 may be configured to schedule an appointment via a customer relationship management (CRM) platform or software application. In another example, event post-processing engine 140 may be configured to send a follow-up email to the customer some period of time after the customer's inquiry. This follow-up email may inquire whether the customer is still interested in the particular product which was the basis of the customer's original inquiry.

In an example, in response to receiving a query (e.g., customer inquiry 105), classification engine 110 classifies the query. For example, classification engine 110 may determine whether the inquiry is about the availability of a vehicle, the number of questions that are contained in the customer query, and so on. Classifying the query can also be referred to as understanding what the customer is talking about. One goal of classifying the query is to determine the topic of the query. Another goal is to obtain validated contact information of a customer, such as a phone number and/or email address. Additionally, classification engine 110 may determine the number of questions that are contained in the customer query. Dialogue state tracking engine 120 unifies the whole conversation, receiving the response from classification engine 110 to determine what the customer is talking about and holding what the customer is talking about as a context of the conversation. After inventory query engine 130 has accessed the inventory feed, the dialogue state tracking engine 120 has the necessary details to generate one ore more actions, via actions generator 125, to respond to the customer query. The actions may include, for example, the following: generating a response to the query, asking a question (e.g., Would you like to schedule an appointment?), and taking decisions on the next steps. Scheduling an appointment directly into the CRM platform is one action that may be taken. Other actions include building content to send, such as retrieving photos if a customer asked for photos of a particular car.

In an example, if the query was "Is this car still available?", the query may be tagged or labeled as having a topic related to "Car Availability". In another example, if the query was "Can I get financing for 3 years?", the query may be tagged with a topic field specified as "Financing". Then the other pieces of information retrieved from the query would be used to generate the response based on the topic being tagged as "Financing". If the query was "Does the car have tinted windows?", the query may be tagged as having a topic related to "Car Specification". These are intended to be a few examples of queries being tagged with a particular topic based on the classification engine 110 classifying the query. Other types of queries may be handled in other similar fashions. Additionally, other types of topics (e.g., Warranty, Promotions) related to vehicle purchases may be identified in other examples.

It is noted that in other embodiments, dialogue state tracking system 100 may be structured differently and/or include other suitable arrangements of components. Additionally, other components may be included in a dialogue state tracking system in other embodiments. Still further, the functionality of the different components may be partitioned into additional components and/or combined into different arrangements of components.

It should be understood that the examples provided throughout this document of a customer inquiring about a vehicle are merely representative of one type of scenario that may be encountered. In other embodiments, customer inquiries may be related to other endeavors besides purchasing a vehicle, such as purchasing other types of products, booking a hotel room, booking a flight, making a doctor's appointment, making a reservation at a restaurant, and so on. Accordingly, the examples of vehicle inquiries are merely intended as non-limiting examples and should not limit the scope of the methods and mechanisms disclosed herein. In other words, the methods and mechanisms disclosed herein are capable of handling other types of customer inquiries besides inquiries related to purchasing a vehicle.

Figure 2:
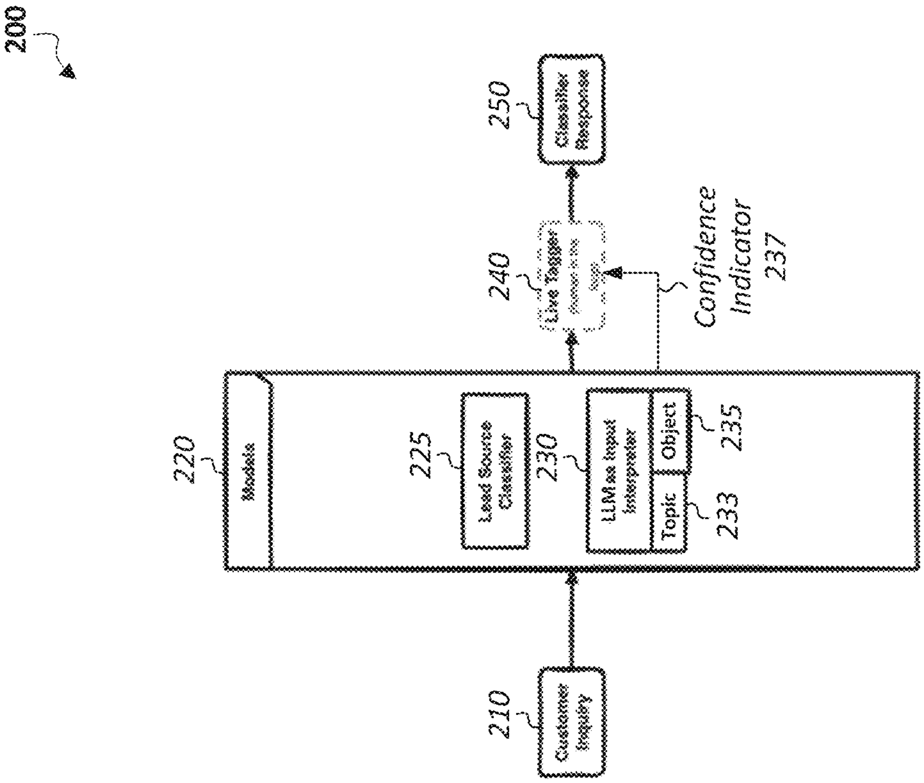
FIG. 2 illustrates an example of a classification engine workflow, in accordance with some example implementations of the current subject matter.

Turning now to FIG. 2, an example of a classification engine workflow 200 is shown, in accordance with some example embodiments. The workflow 200 is initiated when a customer inquiry 210 is received and provided to models component 220. Within workflow 200, the lead source classifier 225 categorizes the customer inquiry 210 based on the source (e.g., website, form submission) where the inquiry originated. This classification is utilized for understanding the context, details, and meta information of the customer request. As used herein, the term "meta information" is defined as the extra information ancillary to the main request generated by the customer. For example, the meta information may include such information as a timestamp, the lead platform on which the inquiry was generated, whether the customer is a repeat customer, predictions and/or assessments generated based on prior encounters with the customer, and so on.

Following the assessment and categorization performed by the lead source classifier 225, the large language model (LLM) as input interpreter 230 may analyze the classified inquiry to extract the topic 233 and the object 235 associated with the classified inquiry. This dual analysis enables generating a nuanced understanding of the inquiry and preparing an accurate response. In an example, LLM as input interpreter 230 is a large language model that uses machine learning techniques for natural language processing (NLP). Although some of the examples herein refer to LLM and its use as part of the conversational AI framework, other types of machine learning (ML) models, such as generative pre-trained transformers, neural networks, Generative Adversarial Networks (GANs) and/or the like may be trained and used as well.

As used herein, the term "topic" is defined as what the customer is attempting to achieve with their inquiry. Also, as used herein, the term "object" is defined as the specific subject or item that the inquiry is related to. An example of a topic would be a scheduling an appointment, while an example of an object would be tomorrow at 5 pm. Another example of an object could be a blue Ford automobile. Other examples of topics and objects are possible and are contemplated.

After the LLM as input interpreter 230 has interpreted the input, in some cases, there may be a brief interaction with a live tagger 240. This step involves a human who evaluates the model's output, ensuring that the classification output is correct. The human involvement acts as a quality control. The final step of workflow 200 is the generation of the classifier response 250. The classifier response 250 is a synthesis of the automated classifications and interpretations made by the models, optionally refined by the human live tagger 240.

In an example, live tagger 240 is utilized based on the value of confidence indicator 237. In this example, confidence indicator 237 is generated as an indication of how confident the model is in the classification of the customer inquiry 210. In some cases, confidence indicator 237 may include multiple confidence scores, such as a first confidence score specifying the confidence in the topic 233 and a second confidence score specifying the confidence in the object 235. In an example, if the confidence indicator 237 is less than a threshold, then live tagger 240 may be utilized to act as a quality control to evaluate the model's output to ensure that the classification output is correct. In another example, when confidence indicator 237 includes multiple confidence scores, if the weighted average of multiple confidence scores is less than a threshold, then live tagger 240 is utilized. Otherwise, if the weighted average of the multiple confidence scores is greater than or equal to the threshold, then live tagger 240 is bypassed.

Figure 3:
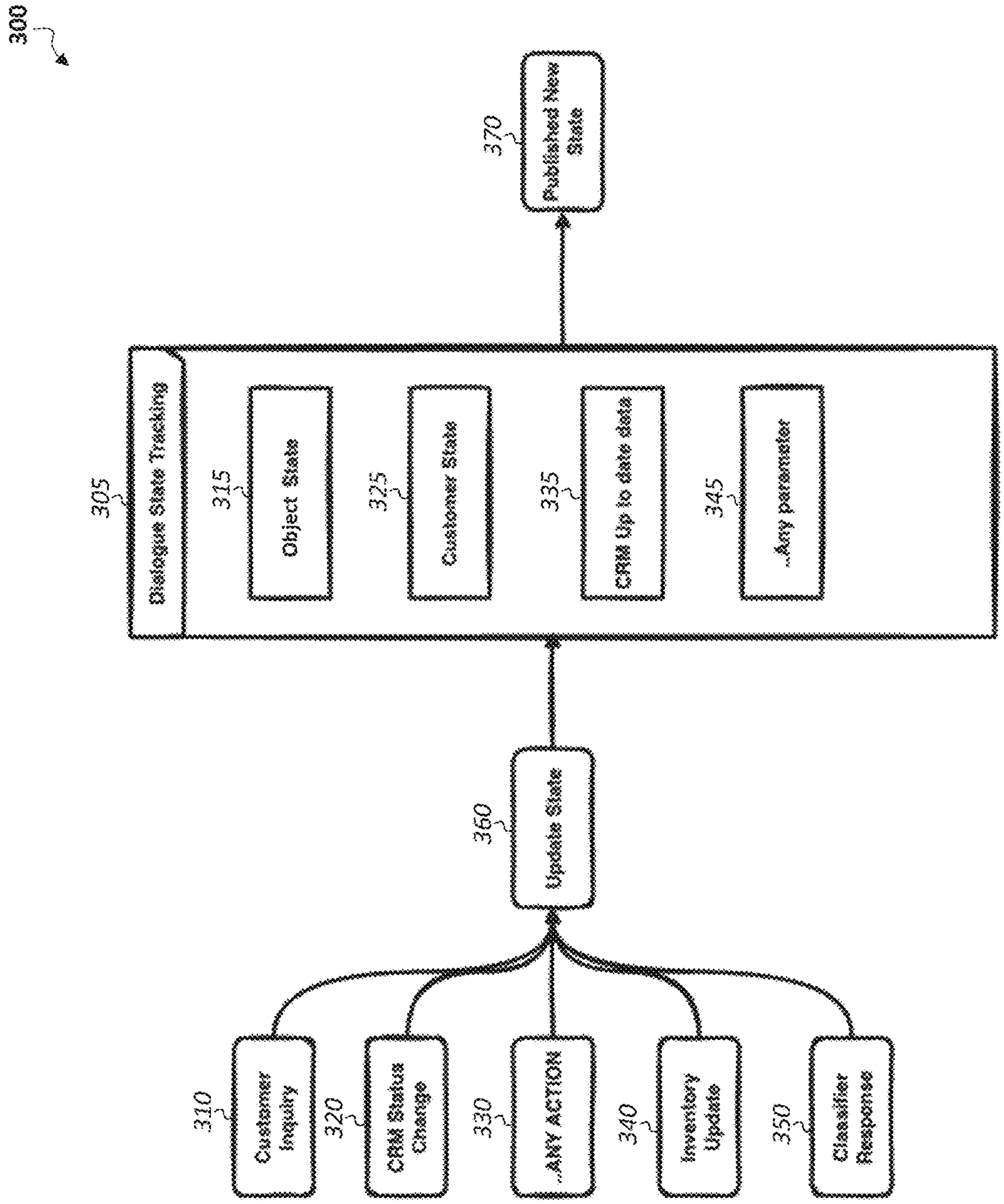
FIG. 3 illustrates an example of a dialogue state tracking engine workflow, in accordance with some example implementations of the current subject matter.

Referring now to FIG. 3, a dialogue state tracking engine workflow 300 is shown, in accordance with some example embodiments. In the dialogue state tracking engine 305 of the conversational AI system, the workflow 310 is initiated by various inputs such as a customer inquiry 310, a CRM status change 320, action execution 330, an inventory update 340, or a classifier response 350. These inputs may trigger an action within the system to update the state as represented by the "Update State" function box 360.

The "Update State" function 360 takes the initial input and modifies the current dialogue state accordingly. This updated information includes the object state 315, which may include data pertaining to specific items or services about which the customer is inquiring. The updated information also includes the customer state 325, which involves personal customer information or interaction history. The updated information also includes CRM up-to-date data 335 which encompasses any recent changes in the CRM system that needs to be accounted for in the dialogue. For example, if the vehicle about which a given customer was inquiring was sold to someone else, then this information would need to be relayed to the given customer. One or more similar vehicles (which are still available) may be identified to provide the customer with other choices now that their preferred vehicle is no longer available. Alternatively, if the price of a particular vehicle has changed, then the updated price may be provided to the customer. The system also allows for the inclusion of any additional parameters 345 that may be part of the conversation's context.

After the state has been updated with the relevant data, the new comprehensive state is published, as represented by "Published New State" box 370 on the right-side of FIG. 3. This updated state ensures that the conversational AI system has the most current information available to make informed decisions for future interactions and to maintain a coherent and contextually aware dialogue with the user.

Figure 4:
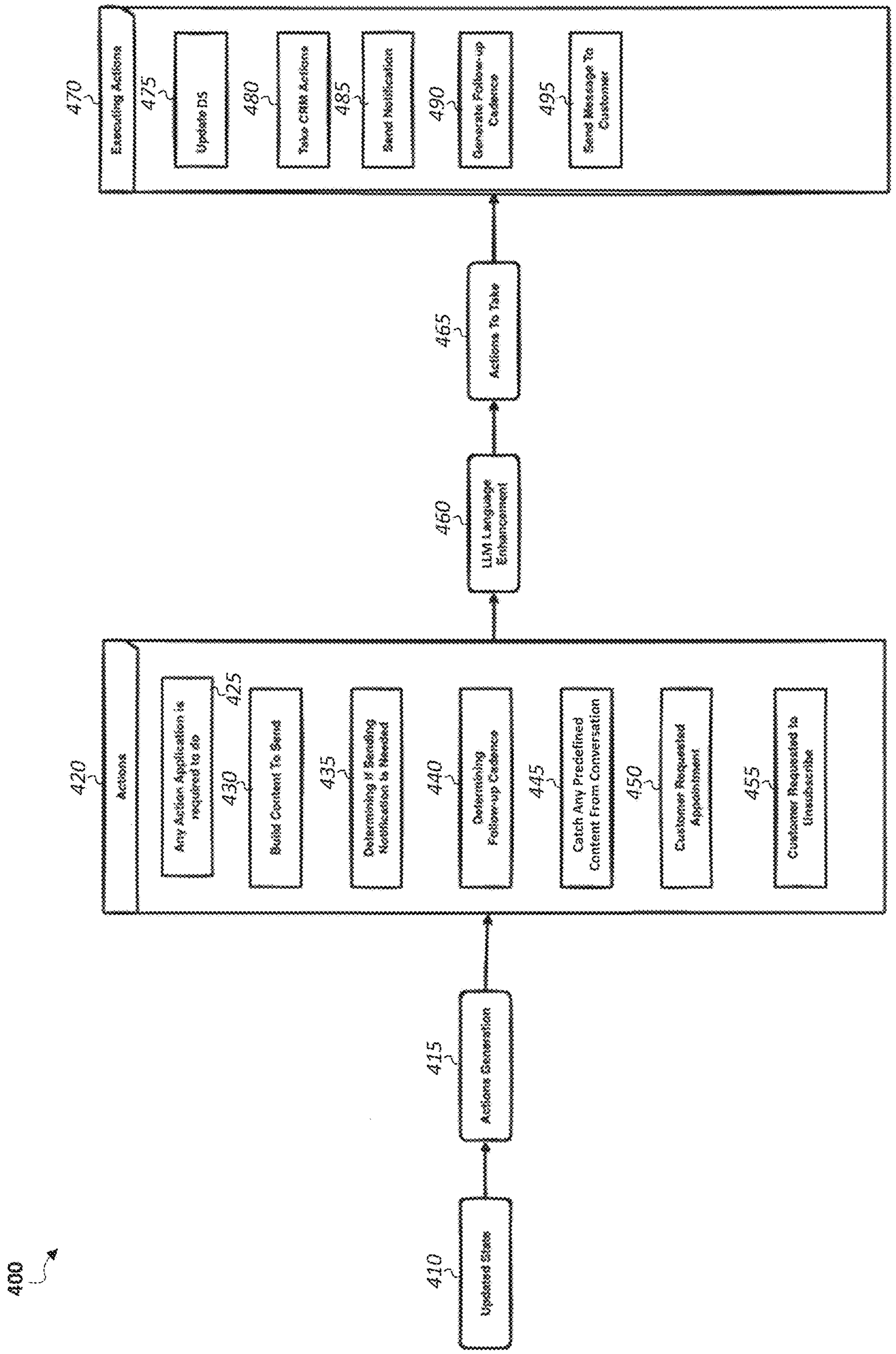
FIG. 4 illustrates an example of an action generation and execution stage of a conversational artificial intelligence (AI) framework, in accordance with some example implementations of the current subject matter.

Turning now to FIG. 4, an action generation and execution stage 400 of a conversational AI framework is shown, in accordance with some example embodiments. In the generating and executing actions stage 400, the workflow is initiated with an updated state 410 reflecting the latest state in customer interactions. The actions generation step 415 identifies the necessary actions 420 that should be taken, such as crafting messages, deciding on notifications, and follow-up timing. These actions 420 include one or more of the following: any action the software application is required to perform 425, build content to send 430, determining if sending a notification is needed 435, determining follow-up cadence 440, catch any predefined content from conversation 445, customer request for appointment 450, customer request to unsubscribe 455, and other actions. If any actions 420 to be taken include the generation of text, LLM language enhancement module 460 enhances the language of the text ensuring responses, follow-ups, and notifications appear friendly and non-robotic. This helps to improve the tone of automated communications significantly.

The system proceeds from the actions to take phase 465 to the executing actions phase 470. In the executing actions phase 470, the system updates the dialogue state (DS) 475, performs CRM Actions 480, sends out human-like notifications 485, establishes a relatable follow-up cadence sequence 490, and sends messages to customers 495. LLM's integration ensures that interactions are human-like, natural, and personalized.

Figure 5:
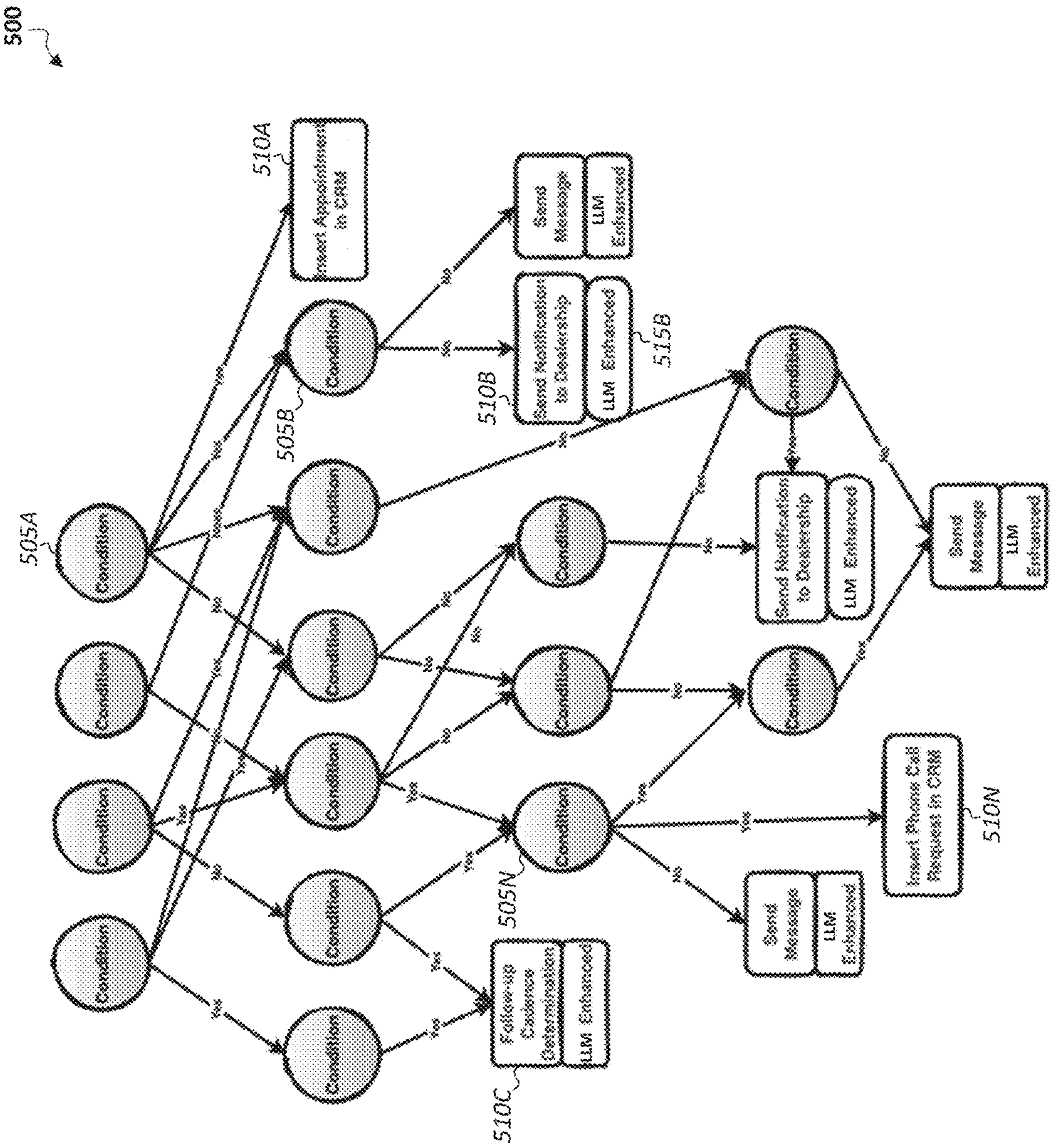
FIG. 5 illustrates a diagram of a logic tree implementing dialogue state tracking logic control layers, in accordance with some example implementations of the current subject matter.

Referring now to FIG. 5, a diagram of a logic tree 500 implementing dialogue state tracking logic control layers is shown, in accordance with some example embodiments. Logic tree 500 represents the action generation used in the conversational AI framework for determining the next steps in a customer interaction process. Each node in logic tree 500 labeled "Condition" represents a decision point where the conversational AI system evaluates the given situation based on the tracked dialogue state. Based on the outcome of this evaluation, the system proceeds along branches labeled "Yes" or "No" to the next condition or action.

If certain conditions are met (e.g., condition 505A "Yes" leg), the system may perform specific actions such as inserting an appointment directly into the Customer Relationship Management (CRM) system (e.g., box 510A). Additional actions include sending a notification to the dealership (e.g., box 510B from the "No" branch of condition 505B), indicating that a particular action may be needed from their end. Further actions include sending a LLM-enhanced message to the customer (e.g., box 515B), which could be a follow-up message, a confirmation, or any other communication deemed necessary by the previous conditions. In some branches, the system determines the follow-up cadence (e.g., box 510C), which might involve scheduling future communications or actions to stay engaged with the customer. Another branch (e.g., condition 505N "Yes" leg) leads to inserting a phone call request in the CRM (e.g., box 510N), signaling that a live call should be placed to the customer.

The logic tree 500 may be designed to be adaptable, allowing for customization to meet the specific requirements of different organizations, different dealerships, different companies, and so on. The logic tree 500's decision points (i.e., the "Condition" nodes) may be tailored to reflect the host organization's unique sales tactics, customer service approaches, and operational protocols. This customization enables the creation of various branches and clusters within logic tree 500 that correspond to distinct dealership services or customer interaction scenarios, ensuring a personalized and efficient customer service experience.

Figure 6:
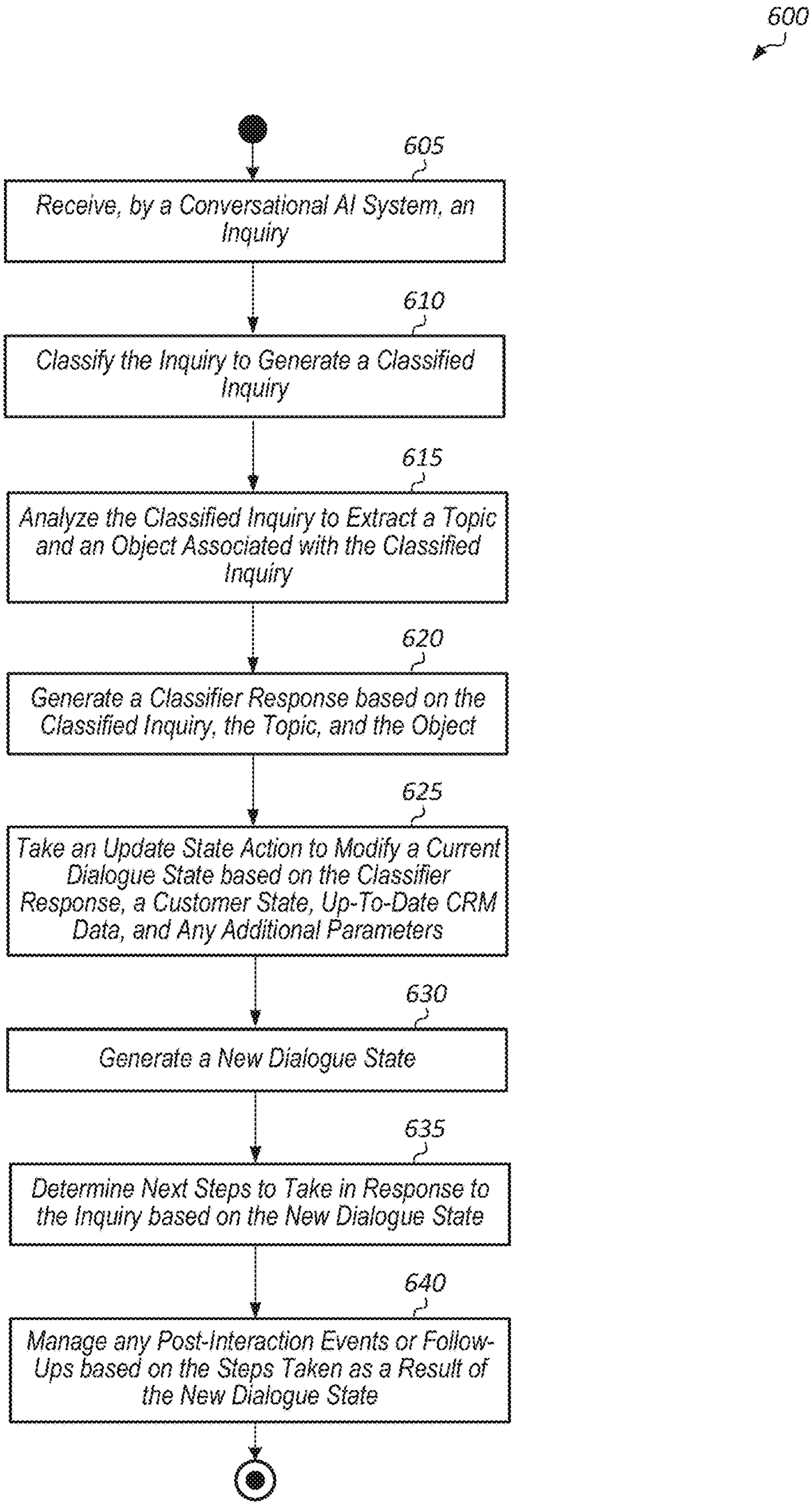
FIG. 6 illustrates an example of a process for operating a conversational AI system according to a conversational AI framework, in accordance with some example implementations of the current subject matter.

Turning now to FIG. 6, a process is depicted for operating a conversational AI system according to a conversational AI framework, in accordance with some example embodiments. At the beginning of the process, an inquiry is received by a conversational AI system (block 605). The inquiry may also be referred to as a customer inquiry, input, customer input, request, customer request, query, or the like. Depending on the embodiment, the conversational AI system may manage and/or include one or more conversational AI agents. In some cases, a single conversational AI agent receives the inquiry in block 605. In other cases, the conversational AI system receives and response to the inquiry in block 605. In further cases, a conversational AI system receives the inquiry in block 605, and the conversational AI system forwards the inquiry to the appropriate conversational AI agent for handling, or the conversational AI system launches a new conversational AI agent to process the inquiry. Accordingly, when the conversational AI system is described as performing some action, it should be understood that this may involve one or more conversational AI agent(s) performing the described action(s). Generally speaking, the conversational AI system and/or the conversational AI agent may operate according to the conversational AI framework described in this specification.

In response to receiving the inquiry, the conversational AI system classifies the inquiry to generate a classified inquiry (block 610). In an example, a lead source classifier (lead source classifier 225 of FIG. 2) performs block 610. In this example, the lead source classifier assesses the inquiry and categorizes the inquiry based on the source (e.g., website, form submission) where the inquiry originated. The classification may be made based on the context, details, and meta information of the inquiry.

Next, the classified inquiry is analyzed to extract a topic and an object associated with the classified inquiry (block 615). In an example, a LLM as input interpreter (e.g., LLM as input interpreter 230 of FIG. 2) performs block 615. In this example, the LLM as input interpreter determines the topic based on what the customer is aiming to achieve with their inquiry. Also in this example, the LLM as input interpreter determines the object based on the specific subject about which the customer is inquiring. Then, a classifier response is generated based on the classified inquiry, the topic, and the object (block 620).

Next, as a result of the classifier response, an update state action is taken to modify the current dialogue state based on the classifier response, the customer state, up-to-date CRM data, and any additional parameters (block 625). In an example, a dialogue state tracking engine (e.g., dialogue state tracking engine 305 of FIG. 3) modifies the current dialogue state based on the topic, the object, the customer state, up-to-date CRM data, and any additional parameters. The customer state refers to a state that is based on the personal customer information and/or interaction history of the customer. The up-to-date CRM data encompasses any recent changes in the CRM system that need to be accounted for in the dialogue. The additional parameters include any parameters, data, or meta information that may influence the conversation's context.

Then, after the update state action is taken, a new dialogue state is generated (block 630). Next, an actions generator module (e.g., actions generator module 125 of FIG. 1) determines next steps to take in response to the inquiry based on the new dialogue state (block 635). Then, an event post-processing engine (e.g., event post-processing engine 140) manages any post-interaction events or follow-ups based on the steps taken by the actions generator module as a result of the new dialogue state (block 640). After block 640, method 600 may end.

Figure 7:
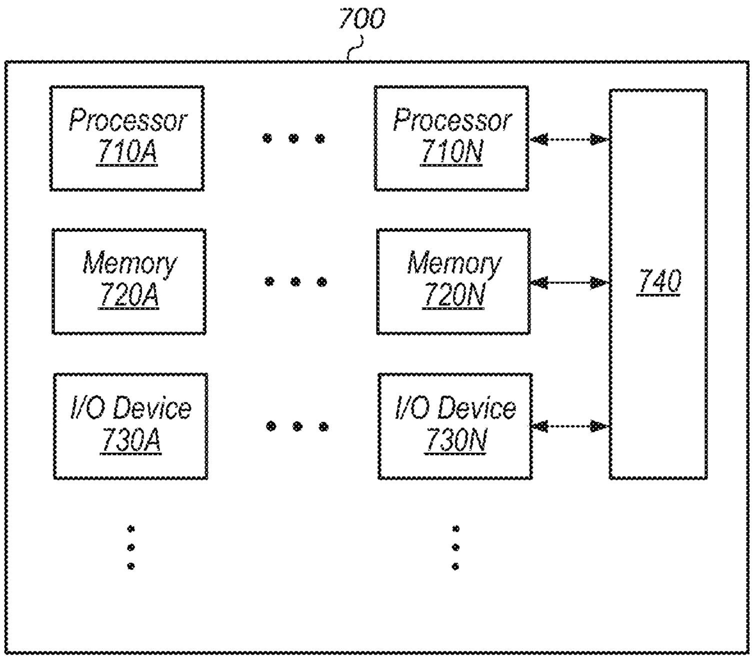
FIG. 7 depicts a block diagram of a computing system, in accordance with some example implementations of the current subject matter.

Referring now to FIG. 7, a block diagram illustrating an example of computing system 700 is shown, in accordance with implementations of the current subject matter. Computing system 700 may be configured to implement at least a portion of any of the conversational AI framework components, modules, and/or engines depicted herein using a plurality of physical resources. One or more instances of computing system 700 may be employed. The physical resources of computing system 700 are shown in FIG. 7, with these physical resources including processors 710A-N, memory devices 720A-N, input/output (I/O) devices 730A-N, and other physical components. Each of the components 710A-N, 720A-N, and 730A-N may be interconnected using a bus, fabric, and/or other interconnect components. The one or more interconnect components are represented by interconnect 740 in FIG. 7.

Processors 710A-N are representative of any number and type of processing devices, including central processing units (CPUs), graphics processing units (GPUs), field programmable gate arrays (FPGAs), and so on. The processors 710A-N may be configured to process instructions for execution within the system 700. Memory devices 720A-N are representative of any number and type of memory or storage devices. Memory devices 720A-N may store program instructions which are executable by the processors 710A-N, and memory devices 720A-N may store various types of data. I/O devices 730A-N may include any number and type of devices for transmitting and receiving data to and from users, other devices, and/or other systems. For example, I/O devices 730A-N may include components such as a keyboard, mouse, touchpad, and/or a display unit for displaying graphical user interfaces. I/O devices 730A-N may also include network devices configured to transmit and receive data over one or more networks. Computing system 700 may also include any number and type of other physical resources, with the number and type of other physical resources varying from implementation to implementation. It is noted that computing system 700 may also be referred to as a computing apparatus.

Figure 8:
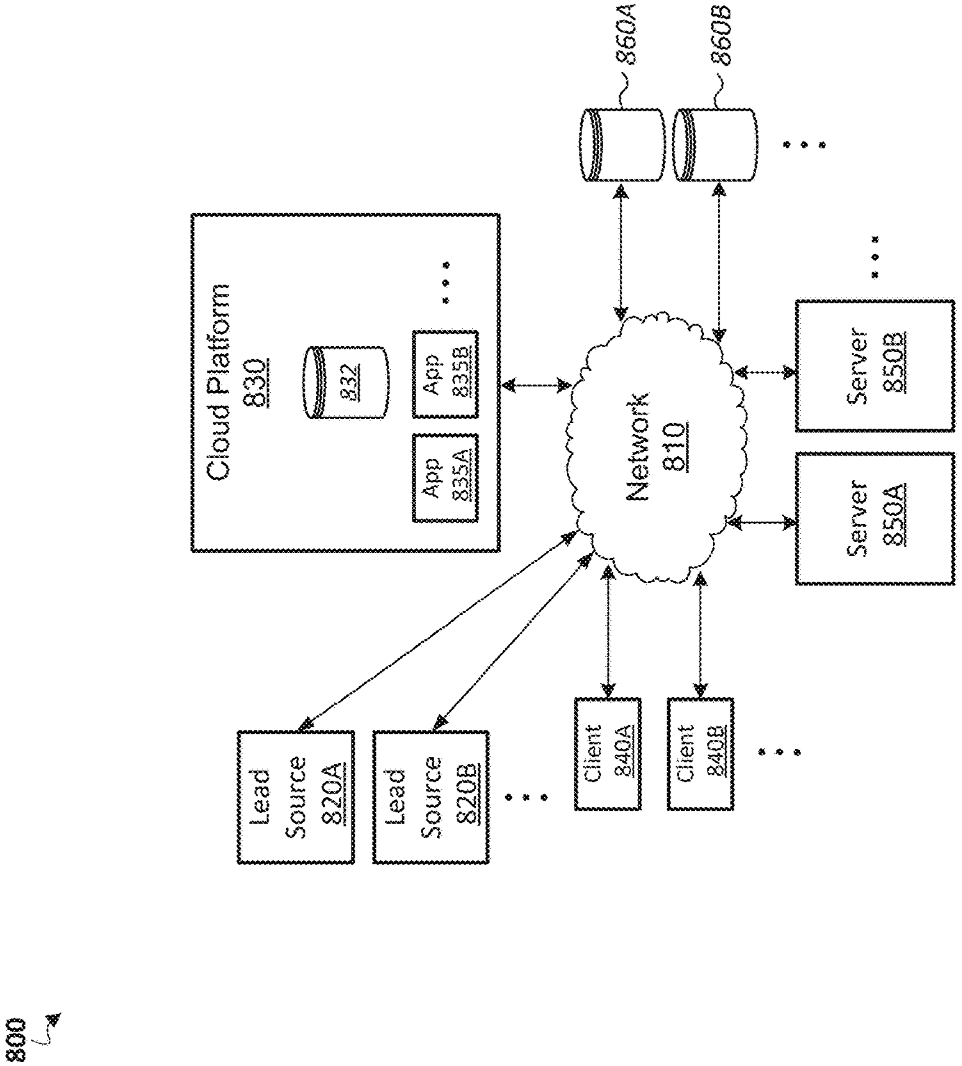
FIG. 8 illustrates a diagram of an example of a system, in accordance with some example implementations of the current subject matter.

Turning now to FIG. 8, a diagram illustrating an example of a system 800 is depicted consistent with implementations of the current subject matter. In an example, the system 800 may include a cloud platform 830. Cloud platform 830 may be configured to provide various applications operating according to a conversational AI framework and/or cloud platform 830 may be configured to provide a variety of other services. The various applications and/or services provided by cloud platform 830 may be implemented as software-as-a-service (SaaS), platform-as-a-service (PaaS), infrastructure as a service (IaaS), and/or the like, and these applications and/or services can be accessed by clients 840A-B.

In FIG. 8, software application 835A may implement one or more conversational AI agents that operate according to the conversational AI framework described herein. Cloud platform 830 may also include software application 835B and any number of other software applications for providing services, resources, and other functionality to a plurality of clients 840A-B. Cloud platform 830 is coupled to various other entities via network 810, including lead sources 820A-B, servers 850A-B, and databases 860A-B. Lead sources 820A-B may be different platforms and/or services that generate leads for software application 835A. Lead sources 820A-B are representative of any number and type of lead sources. In an example, when system 800 implements one or more conversation AI agents for an auto dealership, lead sources 820A-B may include one or more automotive digital retail aggregation websites. For other types of vendors and/or customers, lead sources 820A-B may include other types of platforms.

The network 810 may be any combination of wired and/or wireless networks including, for example, a wide area network (WAN), a local area network (LAN), a public land mobile network (PLMN), the Internet, and/or the like. The client devices 840A-B may be processor-based devices including, for example, one or more of a smartphone, a tablet computer, a wearable apparatus, a virtual assistant, an Internet-of-Things (IoT) appliance, and/or the like. Servers 850A-B are representative of any number and type of servers and/or services accessible by cloud platform 830 via network 810. One or more servers 850A-B may host services such as a SaaS, PaaS, IaaS, or other services and/or platforms. In an example, server 850A includes a LLM as input interpreter (e.g., LLM as input interpreter 230 of FIG. 2). In another example, at least a portion of the functionality of the LLM as input interpreter may be implemented as software application 835B executing on cloud platform 830.

The cloud platform 830 may include physical resources, such as at least one computer (e.g., a server), data storage, and a network (including network equipment) that couples the computer(s) and storage. The cloud platform 830 may also include other resources, such as operating systems, hypervisors, or other resources. In the case of a public cloud platform 830, the services, applications, and/or functionality may be provided on-demand to users via the Internet. Alternatively, the cloud platform 830 may be a private cloud platform, in which case the resources of the cloud platform 830 may be hosted by the private servers of the host organization or company. Alternatively, or additionally, the cloud platform 830 may be considered a hybrid cloud platform, which includes a combination of on-premises resources as well as resources hosted by a public or private cloud platform. For example, a hybrid cloud service may include web servers running in a public cloud while application servers and/or databases are hosted on premise.

In the example of FIG. 8, there are multiple databases 832 and 860A-B, although other quantities of databases may be implemented as well. The first database 832 is internal to the cloud platform 830, but the other databases 860A-B are external to the cloud platform 830, so queries may be sent to and responses received from databases 860A-B using an external network connection. Databases 860A-B may include an inventory database, a CRM database, and so on.

Figure 9:
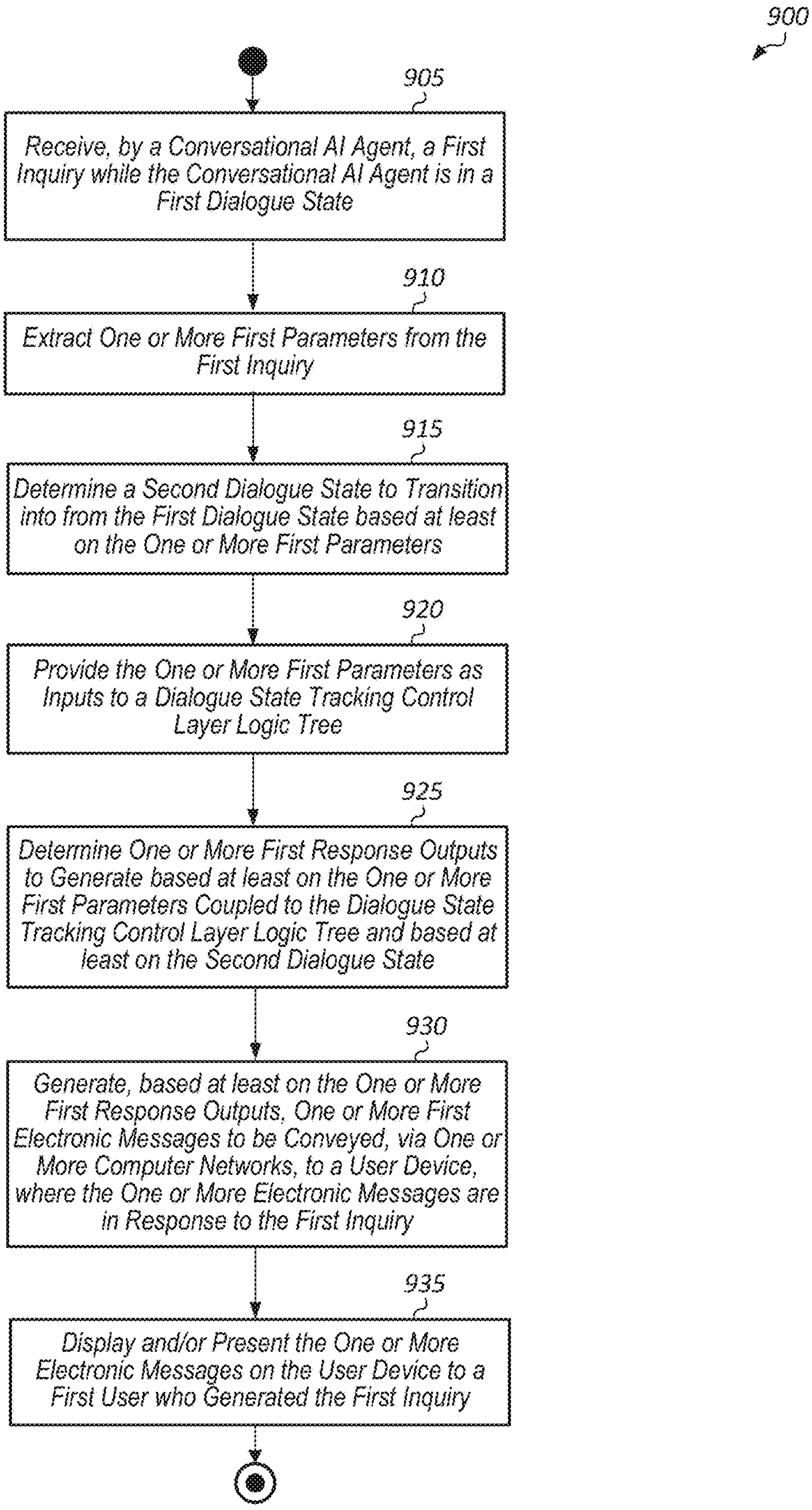
FIG. 9 illustrates an example of a process for implementing a conversational AI agent, in accordance with some example implementations of the current subject matter.

Referring now to FIG. 9, a process is depicted for implementing a conversational artificial intelligence (AI) agent, in accordance with some example embodiments. At the beginning of the process, a first inquiry is received by a conversational artificial intelligence agent while the conversational artificial intelligence agent is in a first dialogue state (block 905). Next, the conversational artificial intelligence agent extracts one or more first parameters from the first inquiry (block 910). In an example, the one or more first parameters include a topic and an object associated with the first inquiry. In other examples, the one or more first parameters include other values and/or data generated based on an analysis of the content and meta information of the first inquiry. Then, the conversational artificial intelligence agent determines a second dialogue state to transition into from the first dialogue state based at least on the one or more first parameters (block 915).

Next, the conversational artificial intelligence agent provides the one or more first parameters as inputs to a dialogue state tracking control layer logic tree (block 920). Then, the dialogue state tracking control layer logic tree determines one or more first response outputs to generate based at least on the one or more first parameters coupled to the dialogue state tracking control layer logic tree and based at least on the second dialogue state (block 925). In an example, the one or more parameters are coupled to one or more conditional nodes within the dialogue state tracking control layer logic tree. In another example, the one or more first parameters are mapped by the conversational artificial intelligence agent to the one or more first response outputs based on the second dialogue state.

After block 925, the conversational artificial intelligence agent generates, based at least on the one or more first response outputs, one or more first electronic messages to be conveyed, via one or more computer networks, to a user device, where the one or more electronic messages are in response to the first inquiry (block 930). Next, the one or more electronic messages are displayed and/or presented on the user device to a first user who generated the first inquiry (block 935). After block 935, method 900 may end.

Figure 10:
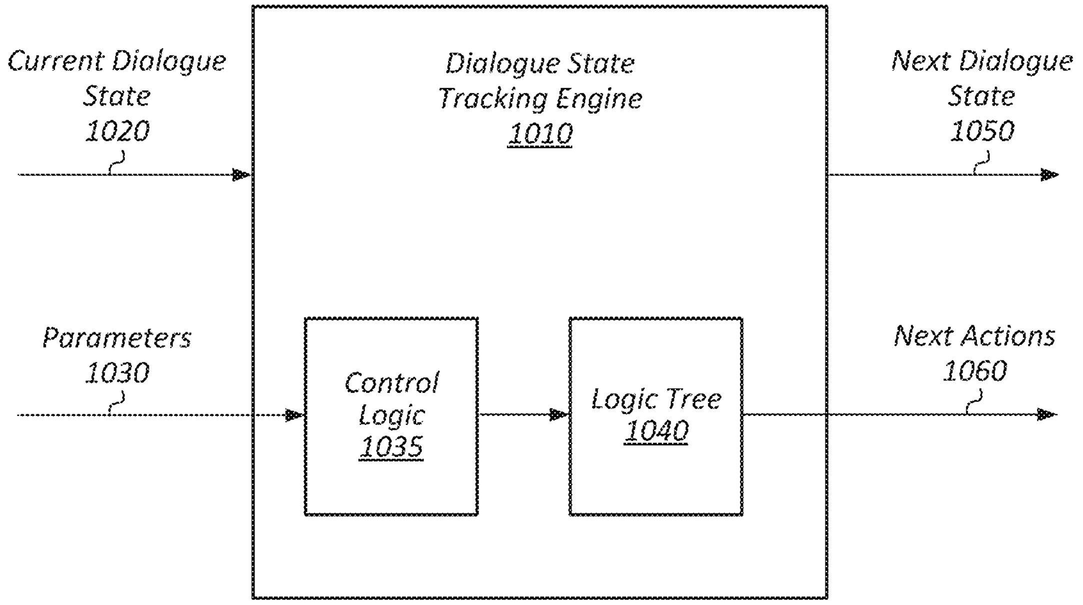
FIG. 10 illustrates a block diagram of a dialogue state tracking engine, in accordance with some example implementations of the current subject matter.

Turning now to FIG. 10, a block diagram of a dialogue state tracking engine 1010 is shown, in accordance with some example embodiments. In an example, parameters 1030 include one or more parameters that are extracted from a customer inquiry and/or parameters that are generated based on an analysis of the customer inquiry. Parameters 1030 may include one or more of a topic, an object, a CRM status change, an inventory update, and/or other parameters.

Dialogue state tracking engine 1010 includes control logic 1035 for receiving parameters 1030 and generating outputs for logic tree 1040, with logic tree 1040 triggering one or more corresponding responses. Control logic 1035 may also be referred to as control unit 1035. Control logic 1035 may be implemented using any suitable combination of circuitry and/or executable program instructions. In an example, logic tree 1040 is structured in a similar fashion to logic tree 500 (of FIG. 5). In other examples, logic tree 1040 may be structured in other suitable manners. Parameters 1030 may be coupled via control logic 1035 to one or more conditional nodes within logic tree 1040, and logic tree 1040 may generate next actions 1060 based on control logic 1035 processing parameters 1030. In an example, control logic 1035 receives parameters 1030 and generates signals, based on parameters 1030, which indicate "Yes" or "No" values to the various nodes of logic tree 1040. These indications of "Yes" or "No" control which branches are taken within logic tree 1040 and trigger one or more next actions 1060 to be taken.

Next actions 1060 are representative of one or more output responses that are to be taken to maintain the flow of the conversation as a result of the customer inquiry. Also, dialogue state tracking engine 1010 may be configured to generate next dialogue state 1050 based on current dialogue state 1020 and based on parameters 1030.

Figure 11:
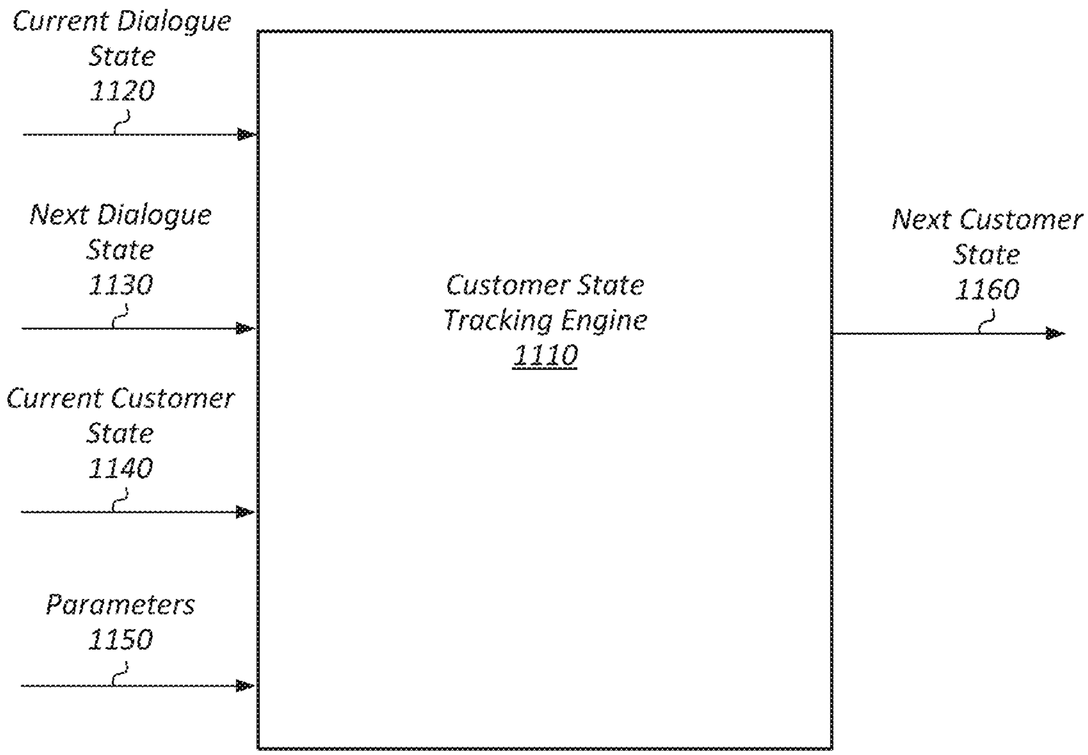
FIG. 11 illustrates a block diagram of a customer state tracking engine, in accordance with some example implementations of the current subject matter.

Referring now to FIG. 11, a block diagram of a customer state tracking engine 1110 is shown, in accordance with some example embodiments. In an example, customer state tracking engine 1110 receives a current dialogue state 1120, next dialogue state 1130, current customer state 1140, and parameters 1150. Parameters 1150 may include one or more of a topic, an object, a CRM status change, an inventory update, and/or other parameters. In this example, customer state tracking engine 1110 generates next customer state 1160 based at least in part on any or all of current dialogue state 1120, next dialogue state 1130, current customer state 1140, and parameters 1150. In an example, customer state tracking engine 1110 may be incorporated within a dialogue state tracking engine (e.g., dialogue state tracking engine 1010 of FIG. 10). Alternatively, in another example, customer state tracking engine 1110 may be implemented separately from the dialogue state tracking engine.

Figure 12:
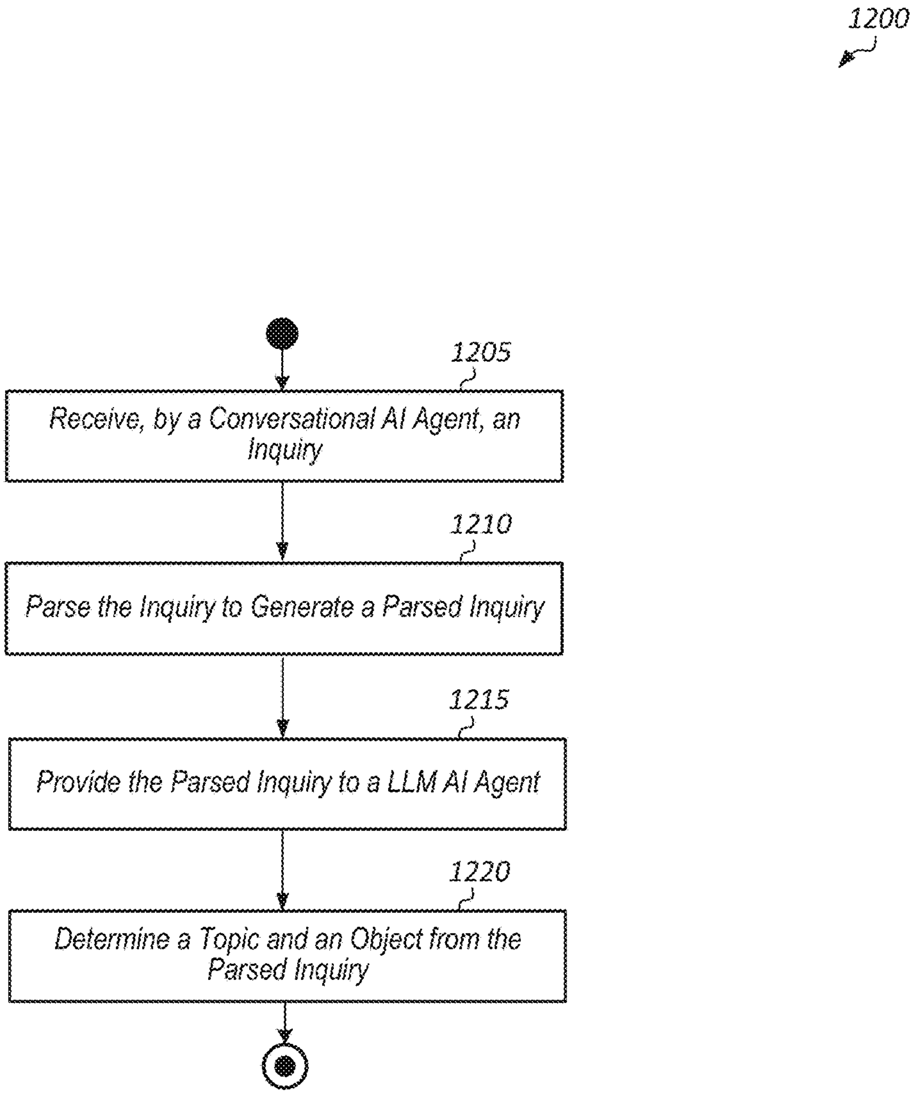
FIG. 12 illustrates an example of a process for parsing a customer inquiry, in accordance with some example implementations of the current subject matter.

Turning now to FIG. 12, a process is depicted for parsing a customer inquiry, in accordance with some example embodiments. At the beginning of the process, an inquiry is received by a conversational artificial intelligence (AI) agent (block 1205). Next, the conversational AI agent parses the inquiry to generate a parsed inquiry (block 1210). In an example, parsing the inquiry involves removing at least a portion of the meta information (e.g., timestamp, lead source, disclaimer, links, images, encryption data) from the inquiry. Then, the parsed inquiry is provided to a LLM AI agent (e.g., LLM as input interpreter 230 of FIG. 2) (block 1215). Next, the LLM as input interpreter determines a topic and an object from the parsed inquiry (block 1220). After block 1220, method 1200 may end.

In some embodiments, the conversational AI agent determines how to parse the inquiry based on the lead source platform from which the inquiry originated. For example, if the inquiry originated from a first lead source platform, the conversational AI agent may utilize a first technique to parse the inquiry. If the inquiry originated from a second lead source platform, the conversational AI agent may utilize a second technique to parse the inquiry, and so on. Each lead source platform may include meta information with the inquiry that is specific to the particular lead source platform, and each lead source platform may structure the inquiry in a manner that is specific to the particular lead source platform. The conversational AI agent may be configured to utilize a parsing approach that is tailored to each different type of lead source platform such that the parsed inquiries include only the details that are relevant for the purposes of the LLM AI agent.

Figure 13:
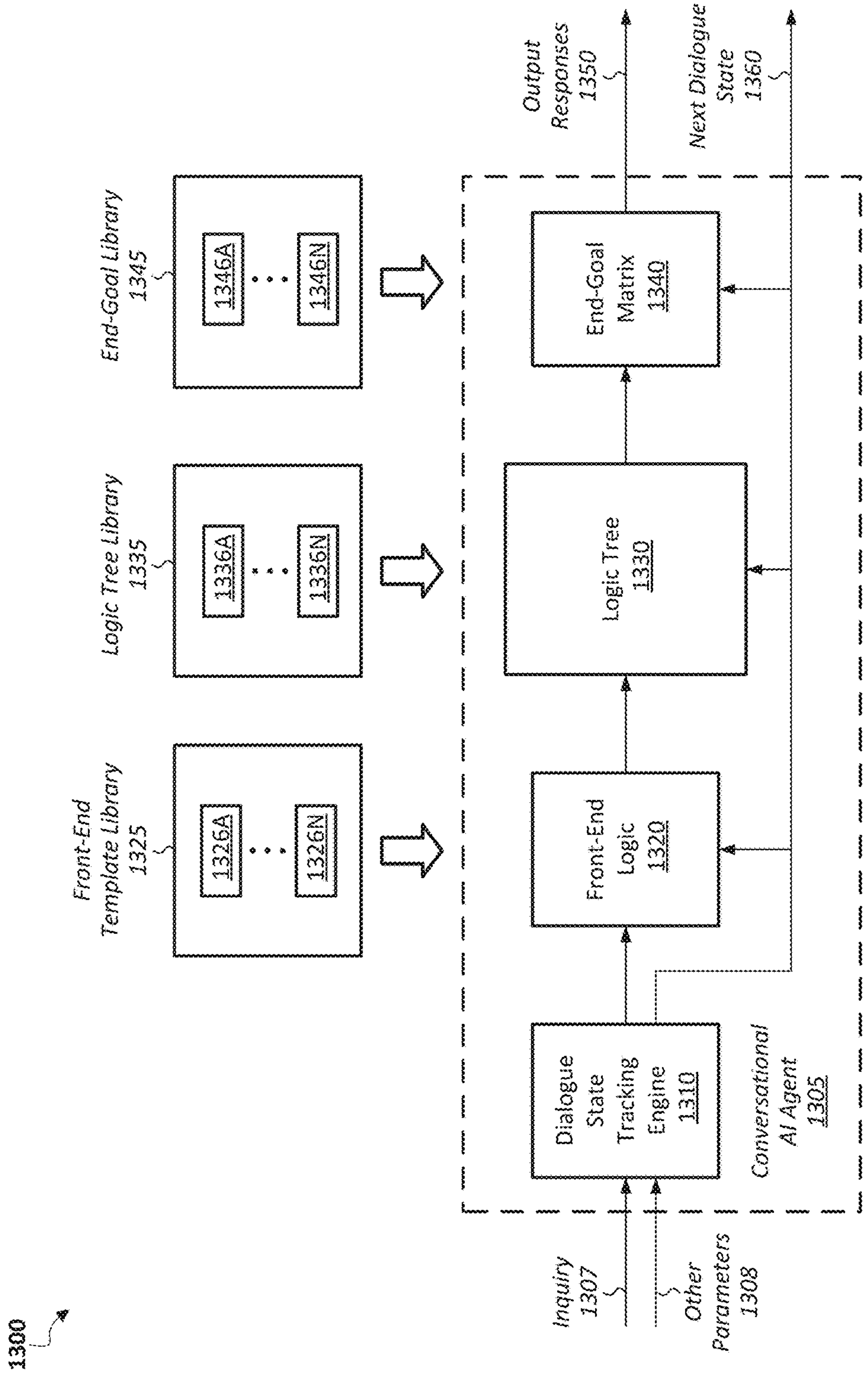
FIG. 13 illustrates a diagram of a system for generating and implementing a customized AI agent for managing dialogues, in accordance with some example implementations of the current subject matter.

Referring now to FIG. 13, a system 1300 is depicted for generating and implementing a customized conversational AI agent 1305 for managing dialogues, in accordance with some example embodiments. An inquiry 1307 and other parameters 1308 may be received by dialogue state tracking engine 1310 of conversational AI agent 1305. Inquiry 1307 may be a customer inquiry received via any of various lead sources, and other parameters 1308 may include updates from a CRM platform, data from an inventory feed, a change in a customer state, and/or other data. It is noted that conversational AI agent 1305 may also be referred to a configurable AI agent, a configurable conversational AI agent, a customizable conversational AI agent, or the like.

Dialogue state tracking engine 1310 may extract one or more parameters from inquiry 1307, and dialogue state tracking engine 1310 may generate a next dialogue state 1360 based on an analysis of inquiry 1307, other parameters 1308, and a current dialogue state. In an example, the one or more parameters extracted from inquiry 1307 may be a topic and one or more objects. The next dialogue state 1360 may be provided to front-end logic 1320, to logic tree 1330, and to end-goal matrix 1340.

Front-end logic 1320 generates one or more control signals based on the parameters extracted from inquiry 1307 by dialogue state tracking engine 1310 and based on the next dialogue state 1360 generated by dialogue state tracking engine 1310. The one or more control signals generated by front-end logic 1320 may be coupled to logic tree 1330 to control one or more conditional nodes within logic tree 1330. It is noted that front-end logic 1320 may be referred to as a "customization front-end" which is applied to logic tree 1330.

In an example, logic tree 1330 may be implemented using a structure similar to logic tree 500 (of FIG. 5). Logic tree 1330 may generate one or more outputs which are coupled to end-goal matrix 1340 to cause one or more output responses 1350 to be generated. End-goal matrix 1340 may include one or more desired goals of the conversation with a customer, such as scheduling an appointment with the customer, receiving contact information of the customer, receiving a down payment, or other actions. It is noted that these desired goals may also be referred to as actionable data points.

For example, when an inquiry 1307 is received from a new customer, a new conversation is initiated with the new customer by conversational AI agent 1305. There may be multiple responses back and forth between the new customer and conversational AI agent 1305, and during the back-and-forth conversation, conversational AI agent 1305 may be attempting to achieve one of the end-goals which has been programmed into end-goal matrix 1340. Logic tree 1330 may include a plurality of different paths through its node structure, with only a subset of these different paths leading to the desired end-goals programmed into end-goal matrix 1340. Each end-goal of end-goal matrix 1340 may have an associated ranking or score, such that not all end-goals are equal. For example, in one particular embodiment for one particular organization, the highest ranked end-goal (i.e., primary goal) is to schedule an appointment with a customer. For this particular organization, the second-highest ranked end-goal (i.e., secondary goal) may be to obtain contact information for the customer. Any number of lower-ranked end-goals may also be defined for customer interactions.

In an example, an organization may be able to configure conversational AI agent 1305 by selecting appropriate components from front-end template library 1325, logic tree library 1335, and end-goal library 1345. These components from front-end template library 1325, logic tree library 1335, and end-goal library 1345 may be pre-configured or configurable, depending on the embodiment. In an example, an organization such as a particular car dealership may wish to generate a conversational AI agent 1305 that is customized for their particular car dealership based on their sales strategy, inventory status, and/or other specific details. In another example, another organization could be a hotel chain which is building a customized conversational AI agent 1305 to handle hotel reservations. Other types of organizations, companies, and/or other entities may perform different types of customizations to conversational AI agent 1305 based on the type of products they are selling, their particular sales tactics, and/or other factors.

In an example, front-end template library 1325 includes a plurality of front-end template components 1326A-1326N, with each component able to support a different type of customization when creating front-end logic 1320 of conversational AI agent 1305. Additionally, logic tree library 1335 includes a plurality of logic trees 1336A-1336N, with multiple different types of node layers with different types of interconnections supporting a different type of customization when creating the structure of logic tree 1330 of conversational AI agent 1305. Still further, end-goal library 1345 includes a plurality of end-goal data point sets 1346A-1346N, with each end-goal data point set able to support a different set of end-goals when creating end-goal matrix 1340 of conversational AI agent 1305. The selections available from front-end template library 1325, logic tree library 1335, and end-goal library 1345 allow each different organization to build a conversational AI agent 1305 that is customized to their particular industry and products, to their particular sales staff, their current inventory, their sales strategy, and so on.

Figure 14:
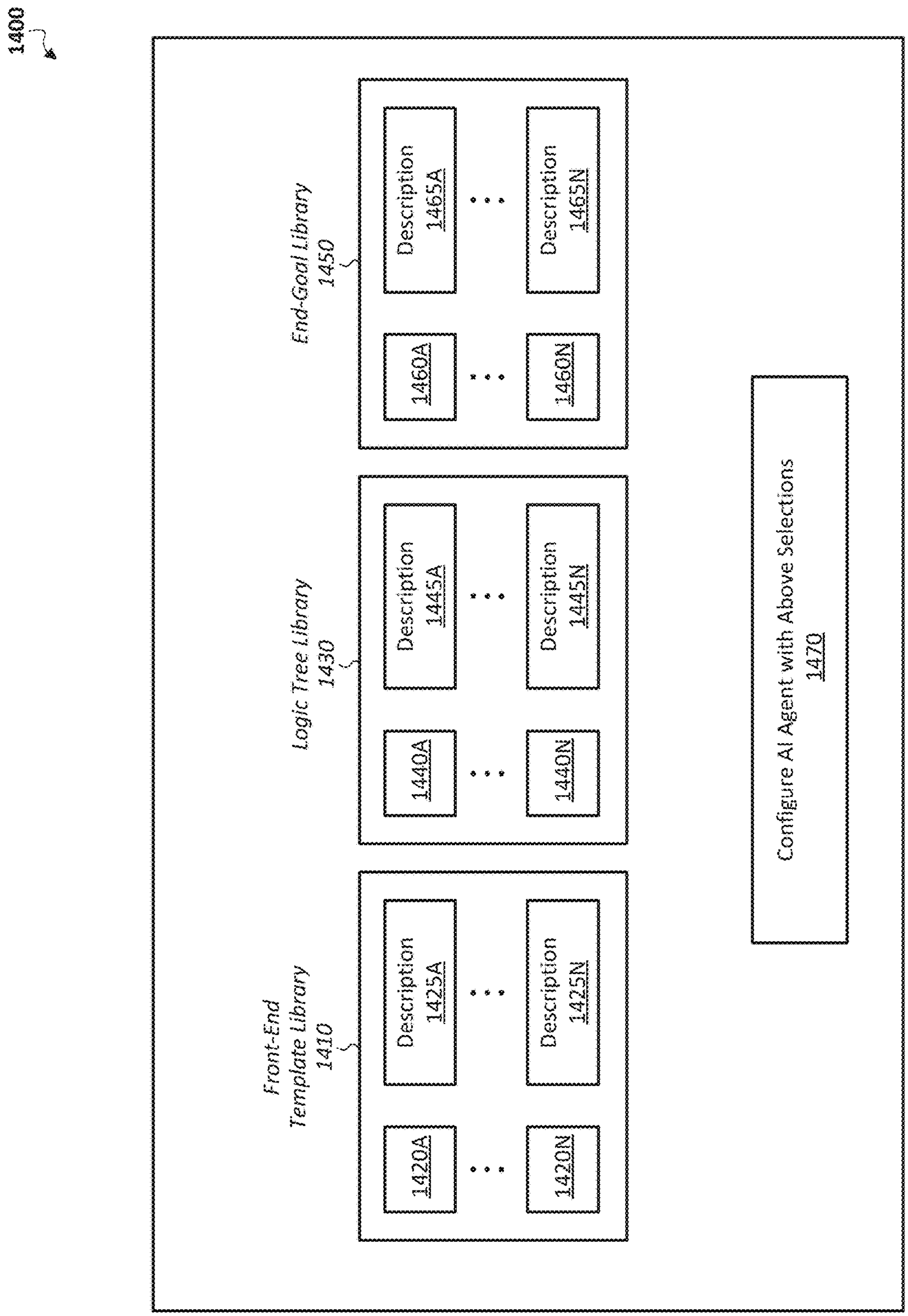
FIG. 14 illustrates an example of a graphical user interface for generating a configurable conversational AI agent, in accordance with some example embodiments of the current subject matter.

Turning now to FIG. 14, an example of a graphical user interface (GUI) 1400 for configuring a customizable conversational AI agent is shown, in accordance with some example embodiments. GUI 1400 includes a plurality of graphical elements with which a user may interact to generate a configurable conversational AI agent (e.g., conversational AI agent 1305 of FIG. 13). These graphical elements may be arranged into groupings corresponding to different components providing different types of functionality for the configurable conversational AI agent. In an example, GUI 1400 may include a selection of front-end templates 1420A-1420N within a front-end template library 1410 section of GUI 1400. Each front-end template 1420A-1420N has a corresponding description 1425A-1425N, with the description including details on the corresponding front-end template. A user may select one of the graphical elements for a given front-end template 1420A-1420N.

Similarly, the user may select one of the graphical elements 1440A-1440N corresponding to different logic tree components within the logic tree library 1430 portion of GUI 1400. Each logic tree component has a corresponding description 1445A-1445N which describes details of how the logic tree is structured, with the description also providing details on the types of scenarios for which the logic tree is designed. Also, the end-goal library 1450 section of GUI 1400 includes different sets 1460A-1460N of end-goals, with corresponding descriptions 1465A-1465N to specify the end-goals and their relative rankings. Once a user has made selections from front-end template library 1410, logic tree library 1430, and end-goal library 1450, the user may click on graphical element 1470 to configure and generate the AI agent with their selections. Clicking on (i.e., selecting) graphical element 1470 may trigger the software to generate the conversational AI agent configured according to the user's selections from front-end template library 1410, logic tree library 1430, and end-goal library 1450. The end result will be a conversational AI agent customized for the user's organization. In other embodiments, other ways of triggering the software to generate the conversational AI agent may be utilized, such as a pull-down menu, dragging and dropping an icon, and/or using other types of graphical elements or based on other types of actions that can be performed within a GUI.

Figure 15:
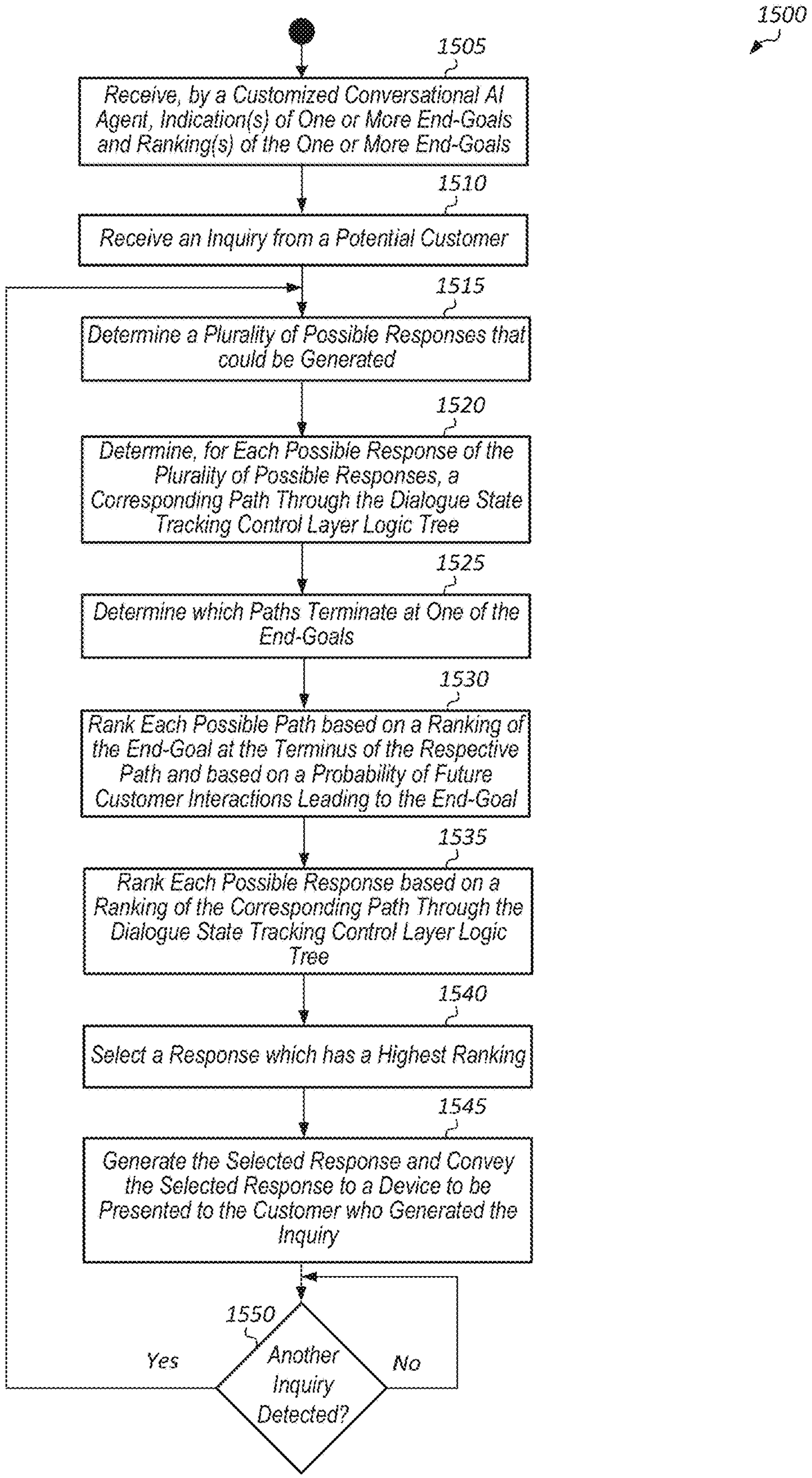
FIG. 15 illustrates an example of a process for generating, by a conversational AI agent, a response to an input inquiry in order to maximize a possibility of reaching a desired end-goal, in accordance with some example implementations of the current subject matter.

Referring now to FIG. 15, a process for generating, by a conversational AI agent, a response to an input inquiry in order to maximize the probability of reaching a desired end-goal is depicted, in accordance with some example embodiments. A customized conversational AI agent (e.g., AI agent 1305 of FIG. 13) receives indication(s) of one or more end-goals and ranking(s) of the one or more end-goals (block 1505). For example, a first end-goal may be scheduling an appointment with a customer, and the ranking of the first end-goal may be 10 on a scale of 1 to 10. In this example, a second end-goal may be obtaining contact information (e.g., email address, phone number) of the customer, and the ranking of the second end-goal may be 8 on a scale of 1 to 10. In other examples, other types of end-goals with other rankings may be received at block 1505. In an example, the customized conversational AI agent is programmed with these indication(s) of one or more end-goals and ranking(s) of the one or more end-goals. The programming may occur via user selections in a GUI (e.g., GUI 1400 of FIG. 14). Alternatively, in another example, the customized conversational AI agent may receive the indication(s) of one or more end-goals and ranking(s) of the one or more end-goals at runtime.

Next, the customized conversational AI agent receives an inquiry from a potential customer (block 1510). As a result of receiving the inquiry, the customized conversational AI agent determines a plurality of possible responses that could be generated (block 1515). In an example, the customized conversational AI agent utilizes a dialogue state tracking control layer logic tree (e.g., logic tree 500 of FIG. 5) to determine the plurality of possible responses that could be generated. Also, the customized conversational AI agent determines, for each possible response of the plurality of responses, a corresponding path through the dialogue state tracking control layer logic tree (e.g., logic tree 500) (block 1520). Next, the customized conversational AI agent determines which paths terminate at one of the end-goals (block 1525). Then, the customized conversational AI agent ranks each possible path based on a ranking of the end-goal at the terminus of the respective possible path and/or based on the probability of future customer interactions (i.e., subsequent inquiries) leading to the end-goal (block 1530). Next, the customized conversational AI agent ranks each possible response based on a ranking of the corresponding path through the dialogue state tracking control layer logic tree (block 1535). Then, the customized conversational AI agent selects a response which has a highest ranking among the plurality of responses (block 1540). Next, the customized conversational AI agent generates the selected response and conveys the selected response to a device to be presented to the customer who generated the inquiry (block 1545). If the customized conversational AI agent detects another inquiry (conditional block 1550, "yes" leg), then method 1500 returns to block 1515. Otherwise, if another inquiry is not detected (conditional block 1550, "yes" leg), then method 1500 remains at conditional block 1550.

Figure 16:
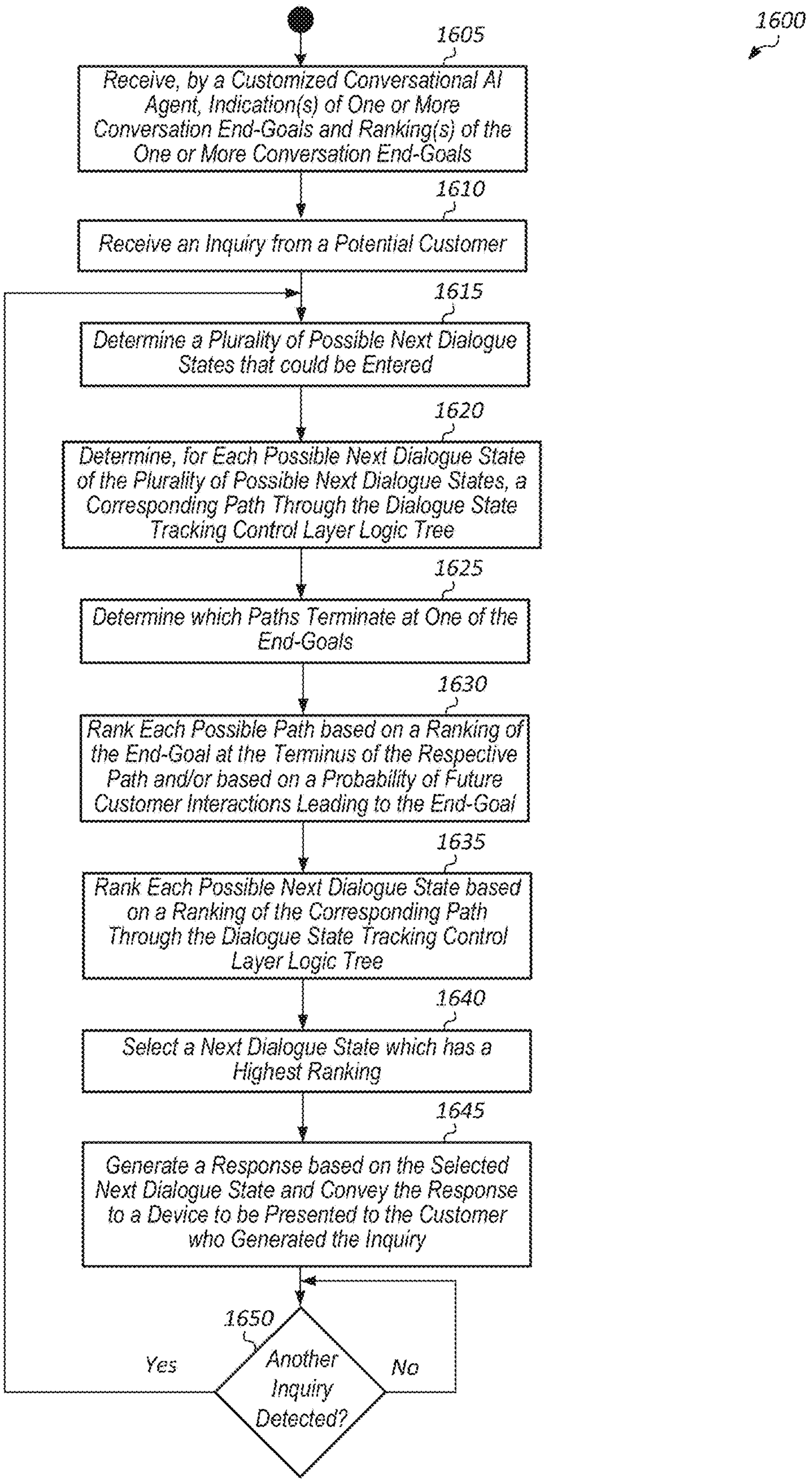
FIG. 16 illustrates an example of a process for determining, by a conversational AI agent, a next dialogue state in response to an input inquiry in order to maximize the possibility of reaching a desired end-goal, in accordance with some example implementations of the current subject matter.

Turning now to FIG. 16, a process for determining, by a conversational AI agent, a next dialogue state in response to an input inquiry in order to maximize the probability of reaching a desired end-goal is depicted, in accordance with some example embodiments. A conversational AI agent (e.g., AI agent 1305 of FIG. 13) receives an indication of one or more conversation end-goals and a ranking of the one or more conversation end-goals (block 1605). For example, a first end-goal may be scheduling an appointment with a customer, and the ranking of the first end-goal may be 10 on a scale of 1 to 10. In this example, a second end-goal may be obtaining contact information (e.g., email address, phone number) of the customer, and the ranking of the second end-goal may be 8 on a scale of 1 to 10. In other examples, other types of end-goals with other rankings may be received at block 1605. It is noted that the terms "end-goal", "actionable data point", "preferred actionable data point", and "desired actionable data point" may be used interchangeably herein.

Next, the conversational AI agent receives an inquiry from a potential customer (block 1610). As a result of receiving the inquiry, the conversational AI agent determines a plurality of possible next dialogue states that could be entered (block 1615). Also, the conversational AI agent determines, for each possible next dialogue state of the plurality of possible next dialogue states, a corresponding path through the dialogue state tracking control layer logic tree (e.g., logic tree 500 of FIG. 5) (block 1620). It is noted that the response that is selected will also affect the path that is taken through the dialogue state tracking control layer logic tree. Examples of taking into account the possible responses that are generated affecting the paths are described in relation to FIG. 15. Depending on the embodiment, the conversational AI agent may determine corresponding paths through the dialogue state tracking control layer logic tree based on each possible next dialogue state independently of the response that is selected to be generated, or the conversational AI agent may determine corresponding paths based on each possible combination of next dialogue states and responses that could be selected. For example, the conversational AI agent may determine a plurality of next dialogue state and response pairs that could be selected, and for each next dialogue state and response pair, determine a corresponding path through the dialogue state tracking control layer logic tree.

After block 1620, the conversational AI agent determines which paths terminate at one of the conversation end-goals (block 1625). Then, the conversational AI agent ranks each possible path based on a ranking of the conversation end-goal at the terminus of the respective path and/or based on the probability of future customer interactions (i.e., subsequent inquiries) leading to the conversation end-goal (block 1630). Next, the conversational AI agent ranks each possible next dialogue state based on a ranking of the corresponding path through the dialogue state tracking control layer logic tree (block 1635). Then, the conversational AI agent selects a next dialogue state which has a highest ranking (block 1640). Next, the conversational AI agent generates a response based on the selected next dialogue state and conveys the response to a device to be presented to the customer who generated the inquiry (block 1645). If the conversational AI agent detects another inquiry (conditional block 1650, "yes" leg), then method 1600 returns to block 1615. Otherwise, if another inquiry is not detected (conditional block 1650, "yes" leg), then method 1600 remains at conditional block 1650. It is noted that method 1600 may be performed in parallel with method 1500 by the conversational AI agent so that the conversational AI agent generates a next dialogue state and response pair that maximizes the probability of reaching one of the desired conversation end-goals.

Figure 17:
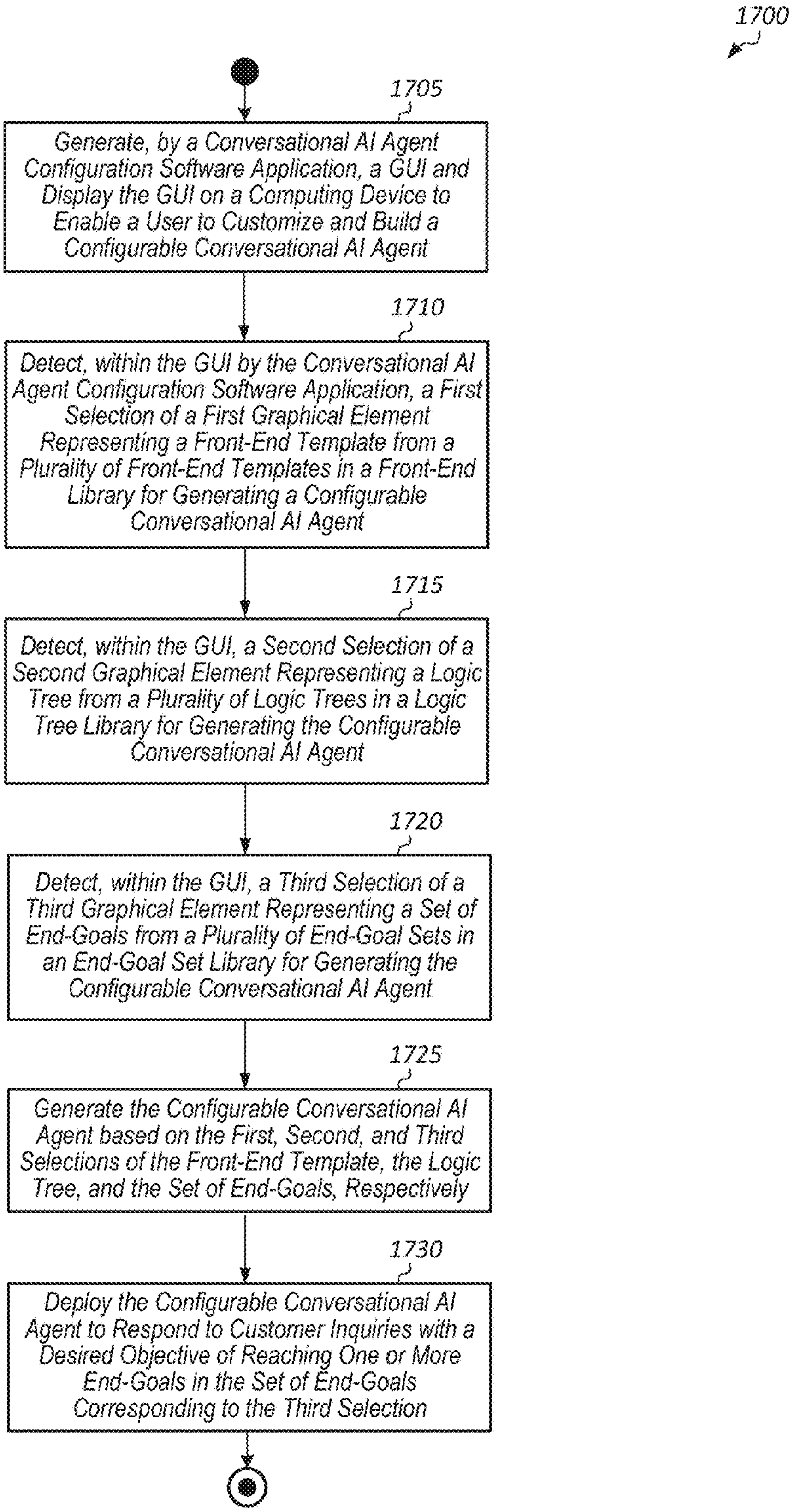
FIG. 17 illustrates an example of a process for generating, by a conversational AI agent configuration software application, a configurable conversational AI agent to respond to customer inquiries, in accordance with some example implementations of the current subject matter.

Turning now to FIG. 17, a process for generating, by a conversational AI agent configuration software application, a configurable conversational AI agent to respond to customer inquiries, is depicted in accordance with some example embodiments. At the beginning of the process, a graphical user interface (GUI) (e.g., GUI 1400 of FIG. 14) is generated by a conversational AI agent configuration software application and displayed on a computing device, where the GUI enables a user to customize and build a configurable conversational AI agent on the computing device (block 1705). In other words, the GUI allows the user to build a customized conversational AI agent tailored to the needs of the user's organization based on the types of products for sale, inventory status, the desired sales tactics, size of the sales team, roles of the different sales personnel, desired end-goals, and so on.

Next, the conversational AI agent configuration software application detects, within the GUI, a first selection of a first graphical element corresponding to a front-end template from a plurality of front-end templates in a front-end library for generating the configurable conversational AI agent (block 1710). Also, the conversational AI agent configuration software application detects, within the GUI, a second selection of a second graphical element corresponding to a logic tree from a plurality of logic trees in a logic tree library for generating the configurable conversational AI agent (block 1715). Additionally, the conversational AI agent configuration software application detects, within the GUI, a third selection of a third graphical element corresponding to a set of end-goals from a plurality of end-goal sets in an end-goal set library for generating the configurable conversational AI agent (block 1720). It is noted that the first, second, and third selections may be made in any order. In other words, the terms "first", "second", and "third" serve to differentiate the different selections but do not necessarily indicate the order in which these selections occur.

Next, the conversational AI agent configuration software application generates the configured conversational AI agent based on the first selection, the second selection, and the third selection of the front-end template, the logic tree, and the set of end-goals, respectively (block 1725). Then, the configurable conversational AI agent is deployed to respond to customer inquiries with a desired objective of reaching one or more end-goals in the set of end-goals corresponding to the third selection (block 1730). After block 1730, method 1700 may end. It is noted that portions of method 1700 may be performed at a later point in time to make adjustments and/or improvements to the configurable conversational AI agent over time.

Figure 18:
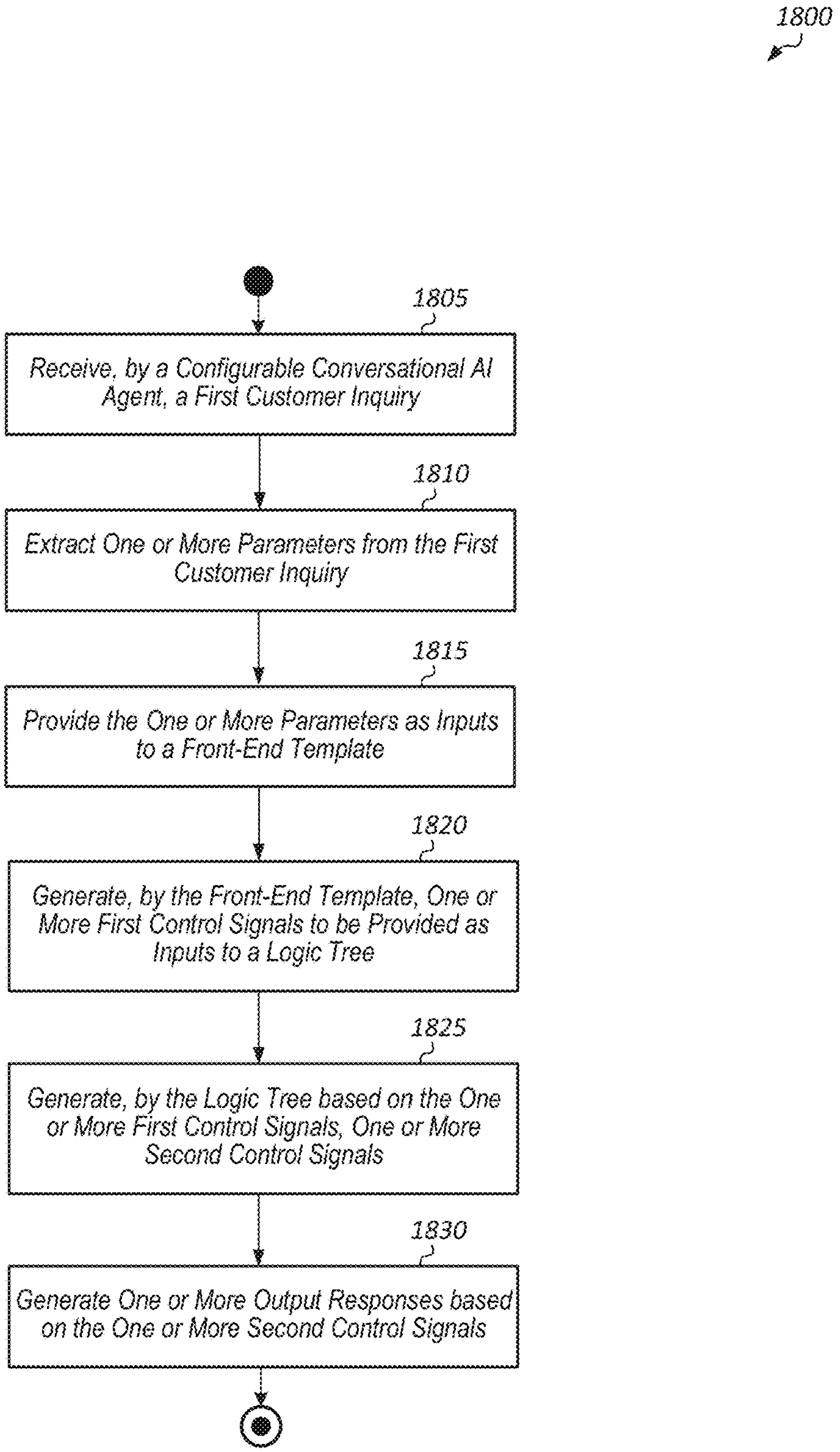
FIG. 18 illustrates an example of a process for deploying a configurable conversational AI agent, in accordance with some example implementations of the current subject matter.

Turning now to FIG. 18, a process for deploying a configurable conversational AI agent is depicted, in accordance with some example embodiments. A configurable conversational AI agent receives a first customer inquiry (block 1805). In response to receiving the first customer inquiry, the configurable conversational AI agent extracts one or more parameters from the first customer inquiry (block 1810). In an example, the one or more parameters include a topic and one or more objects. In other examples, other types of parameters may be extracted from the first customer inquiry. Next, the one or more parameters are provided as inputs to a front-end template (block 1815).

Then, the front-end template generates, based on the one or more parameters, one or more first control signals to be provided as inputs to a logic tree (block 1820). Next, the logic tree generates, based on the one or more first control signals, one or more second control signals (block 1825). Finally, the configurable conversational AI agent generates one or more output responses based on the one or more second control signals (block 1830). After block 1830, method 1800 may end.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible. The term "customer" is intended to mean a current customer, a potential customer, or any individual submitting an inquiry.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system comprising: at least one processor; at least one memory storing instructions that, when executed by the at least one processor, cause operations comprising: classifying, by a conversational artificial intelligence agent in a first dialogue state, an inquiry to generate a classified inquiry; determining, by the conversational artificial intelligence agent, a second dialogue state to transition to from the first dialogue state based at least on the one or more parameters extracted from the classified inquiry; determining one or more response outputs to generate based at least on the one or more parameters and based at least on the second dialogue state; determining one or more electronic messages to generate based at least on the one or more response outputs; and generating the one or more electronic messages to be conveyed, via one or more communication networks, to a computing device, wherein the one or more electronic messages are in response to the inquiry.

Example 2: The system of Example 1, wherein the operations further comprise providing the one or more parameters as inputs to a dialogue state tracking control layer logic tree.

Example 3: The system of any of Examples 1-2, wherein the one or more parameters are coupled to one or more conditional nodes within the dialogue state tracking control layer logic tree, and wherein one or more parameters comprise a topic and an object of the inquiry.

Example 4: The system of any of Examples 1-3, wherein the operations further comprise managing any post-interaction events based at least on the one or more response outputs.

Example 5: The system of any of Examples 1-4, wherein the operations further comprise updating a first database in response to generating the one or more response outputs.

Example 6: The system of any of Examples 1-5, wherein the operations further comprise: parsing the inquiry to generate a parsed inquiry; conveying the parsed inquiry to a large language model artificial intelligence agent; and receiving, from the large language model artificial intelligence agent, a first indication of a topic and one or more second indications of one or more objects of the parsed inquiry.

Example 7: The system of any of Examples 1-6, wherein the operations further comprise conveying the one or more parameters to a front-end template.

Example 8: The system of any of Examples 1-7, wherein the operations further comprise generating, by the front-end template, one or more first control signals to be conveyed to a logic tree.

Example 9: The system of any of Examples 1-8, wherein the operations further comprise generating, by the logic tree based at least on the one or more first control signals, one or more second control signals.

Example 10: The system of any of Examples 1-9, wherein the operations further comprise generating the one or more response outputs based at least on the one or more second control signals.

Example 11: A computer-implemented method comprising: classifying, by a conversational artificial intelligence agent in a first dialogue state, an inquiry to generate a classified inquiry; determining, by the conversational artificial intelligence agent, a second dialogue state to transition to from the first dialogue state based at least on the one or more parameters extracted from the classified inquiry; determining one or more response outputs to generate based at least on the one or more parameters and based at least on the second dialogue state; determining one or more electronic messages to generate based at least on the one or more response outputs; and generating the one or more electronic messages to be conveyed, via one or more communication networks, to a computing device, wherein the one or more electronic messages are in response to the inquiry.

Example 12: The computer-implemented method of Example 11, further comprising providing the one or more parameters as inputs to a dialogue state tracking control layer logic tree.

Example 13: The computer-implemented method of any of Examples 11-12, wherein the one or more parameters are coupled to one or more conditional nodes within the dialogue state tracking control layer logic tree, and wherein one or more parameters comprise a topic and an object of the inquiry.

Example 14: The computer-implemented method of any of Examples 11-13, further comprising managing any post-interaction events based at least on the one or more response outputs.

Example 15: The computer-implemented method of any of Examples 11-14, further comprising updating a first database in response to generating the one or more response outputs.

Example 16: The computer-implemented method of any of Examples 11-15, further comprising: parsing the inquiry to generate a parsed inquiry; conveying the parsed inquiry to a large language model artificial intelligence agent; and receiving, from the large language model artificial intelligence agent, a first indication of a topic and one or more second indications of one or more objects of the parsed inquiry.

Example 17: The computer-implemented method of any of Examples 11-16, further comprising conveying the one or more parameters to a front-end template.

Example 18: The computer-implemented method of any of Examples 11-17, further comprising generating, by the front-end template, one or more first control signals to be conveyed to a logic tree.

Example 19: The computer-implemented method of any of Examples 11-18, further comprising generating, by the logic tree based at least on the one or more first control signals, one or more second control signals.

Example 20: A non-transitory computer readable medium storing instructions, which when executed by at least one data processor, result in operations comprising: classifying, by a conversational artificial intelligence agent in a first dialogue state, an inquiry to generate a classified inquiry; determining, by the conversational artificial intelligence agent, a second dialogue state to transition to from the first dialogue state based at least on the one or more parameters extracted from the classified inquiry; determining one or more response outputs to generate based at least on the one or more parameters and based at least on the second dialogue state; determining one or more electronic messages to generate based at least on the one or more response outputs; and generating the one or more electronic messages to be conveyed, via one or more communication networks, to a computing device, wherein the one or more electronic messages are in response to the inquiry.

Example 21: A computing system comprising: at least one processor; at least one memory storing instructions that, when executed by the at least one processor, cause operations comprising: receiving, by a conversational artificial intelligence agent, a first inquiry while the conversational artificial intelligence agent is in a first dialogue state; extracting one or more first parameters from the first inquiry; determining a second dialogue state to transition to from the first dialogue state based at least on the one or more first parameters; providing the one or more first parameters as inputs to a dialogue state tracking control layer logic tree; determining, by the dialogue state tracking control layer logic tree, one or more first response outputs to generate based at least on the one or more first parameters coupled to the dialogue state tracking control layer logic tree and based at least on the second dialogue state; determining one or more first electronic messages to generate based at least on the one or more first response outputs; and generating the one or more first electronic messages to be conveyed, via one or more computer networks, to a user device, wherein the one or more first electronic messages are in response to the first inquiry.

Example 22: The computing system of Example 21, wherein the one or more first parameters are coupled to one or more conditional nodes within the dialogue state tracking control layer logic tree, and wherein one or more first parameters comprise a topic and an object of the first inquiry.

Example 23: The computing system of any of Examples 21-22, wherein the one or more first electronic messages are presented on the user device to a first user who generated the first inquiry.

Example 24: The computing system of any of Examples 21-23, wherein the operations further comprise: receiving a second inquiry from the first user subsequent to the one or more first electronic messages being displayed on the user device; extracting one or more second parameters from the second inquiry; determining a third dialogue state to transition to from the second dialogue state based at least on the one or more second parameters; determining, by the dialogue state tracking control layer logic tree, one or more second response outputs to generate based at least on the one or more second parameters coupled to the dialogue state tracking control layer logic tree and based at least on the third dialogue state; determining one or more second electronic messages to generate based at least on the one or more second response outputs; and generating the one or more second electronic messages to be conveyed, via the one or more computer networks, to the user device, wherein the one or more first electronic messages are in response to the second inquiry.

Example 25: The computing system of any of Examples 21-24, wherein the operations further comprise classifying the first inquiry to generate a first classified inquiry.

Example 26: The computing system of any of Examples 21-25, wherein extracting the one or more first parameters from the first inquiry comprises determining a topic and an object associated with the first classified inquiry.

Example 27: The computing system of any of Examples 21-26, wherein the operations further comprise managing any post-interaction events based at least on the one or more first response outputs.

Example 28: The computing system of any of Examples 21-27, wherein the operations further comprise updating a first database in response to generating the one or more first response outputs.

Example 29: The computing system of any of Examples 21-28, wherein updating the first database comprises inserting indications of the one or more first response outputs into the first database.

Example 30: The computing system of any of Examples 21-29, wherein the first database is a customer relationship management (CRM) database.

Example 31: The computing system of any of Examples 21-30, wherein the operations further comprise: parsing the first inquiry to generate a first parsed inquiry; conveying the first parsed inquiry to a large language model artificial intelligence agent; and receiving, from the large language model artificial intelligence agent, a first indication of a topic and one or more second indications of one or more objects of the first parsed inquiry.

Example 32: A computing system comprising: at least one processor; at least one memory storing instructions that, when executed by the at least one processor, cause operations comprising: detecting a first selection of a first graphical element corresponding to a front-end template from a plurality of front-end templates in a front-end template library for generating a configurable conversational artificial intelligence agent; detecting a second selection of a second graphical element corresponding to a logic tree from a plurality of logic trees in a logic tree library for generating the configurable conversational artificial intelligence agent; detecting a third selection of a third graphical element corresponding to a set of end-goals from a plurality of end-goal sets in an end-goal set library for generating the configurable conversational artificial intelligence agent; generating the configurable conversational artificial intelligence agent based at least on the first selection, second selection, and third selection; and deploying the configurable conversational artificial intelligence agent to respond to customer inquiries with a desired objective of reaching a first end-goal in the set of end-goals corresponding to the third selection.

Example 33: The computing system of Example 32, wherein the first graphical element, second graphical element, and third graphical element are generated within a graphical user interface displayed on a computing device.

Example 34: The computing system of any of Examples 32-33, wherein deploying the configurable conversational artificial intelligence agent comprises: extracting one or more parameters from a first inquiry received by the configurable conversational artificial intelligence agent; conveying the one or more parameters to the front-end template; generating, by the front-end template, one or more first control signals to be conveyed to the logic tree; generating, by the logic tree based at least on the one or more first control signals, one or more second control signals; and generating one or more output responses based at least on the one or more second control signals.

Example 35: The computing system of any of Examples 32-34, wherein the first end-goal comprises scheduling an appointment with a first user who generated the first inquiry on a computing device.

Example 36: The computing system of any of Examples 32-35, wherein the first end-goal comprises storing an indication of the scheduled appointment in a first database.

Example 37: The computing system of any of Examples 32-36, wherein a second end-goal comprises obtaining contact information of a first user who generated the first inquiry on a computing device.

Example 38: The computing system of any of Examples 32-37, wherein the second end-goal comprises storing an indication of the contact information of the first user in a first database.

Example 39: A computing system comprising: at least one processor; at least one memory storing instructions that, when executed by the at least one processor, cause operations comprising: receiving, by a customized conversational artificial intelligence agent, one or more indications of one or more actionable data points and one or more rankings of the one or more actionable data points; receiving an inquiry; determining a plurality of possible responses that could be generated to the inquiry; determining, for each possible response of the plurality of possible responses, a corresponding path through a dialogue state tracking control layer logic tree; determining which paths terminate at the one or more actionable data points; ranking each possible path based at least on the one or more rankings of the one or more actionable data points and based at least on the probability of subsequent inquiries leading to the one or more actionable data points; ranking each possible response based at least on a ranking of a corresponding path through the dialogue state tracking control layer logic tree; selecting a response which has a highest ranking of a plurality of possible responses; and generating the selected response and conveying the selected response to a computing device to be presented to a user who generated the inquiry.

Example 40: A computing system comprising: at least one processor; at least one memory storing instructions that, when executed by the at least one processor, cause operations comprising: detecting a first selection of a first graphical element corresponding to a front-end template from a plurality of front-end templates in a front-end template library for generating a configurable conversational artificial intelligence agent; receiving, by a customized conversational artificial intelligence agent, one or more indications of one or more actionable data points and one or more rankings of the one or more actionable data points; receiving an inquiry; determining a plurality of possible next dialogue states that could be entered for responding to the inquiry; determining, for each possible next dialogue state of the plurality of possible next dialogue states, a corresponding path through a dialogue state tracking control layer logic tree; determining which paths terminate at the one or more actionable data points; ranking each possible path based at least on the one or more rankings of the one or more actionable data points and based at least on the probability of subsequent inquiries leading to the one or more actionable data points; ranking each possible next dialogue state based at least on a ranking of a corresponding path through the dialogue state tracking control layer logic tree; selecting a next dialogue state which has a highest ranking of a plurality of possible next dialogue states; and generating, based at least on the selected next dialogue state, the selected response and conveying the selected response to a computing device to be presented to a user who generated the inquiry.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A system comprising:

at least one processor;

at least one memory storing instructions that, when executed by the at least one processor, cause operations comprising:

classifying, by a conversational artificial intelligence agent in a first dialogue state, an inquiry to generate a classified inquiry;

determining, by the conversational artificial intelligence agent and based at least on one or more parameters extracted from the classified inquiry, a second dialogue state to transition to from the first dialogue state, wherein the one or more parameters comprise a topic and an object of the inquiry;

determining, based at least on the one or more parameters and based at least on the second dialogue state, one or more response outputs to generate, wherein determining the one or more response outputs further comprises conveying the one or more parameters to a front-end template, generating, by the front-end template, one or more first control signals to be conveyed to a logic tree, wherein the one or more first control signals are coupled to one or more conditional nodes within the logic tree, generating, by the logic tree and based at least on the one or more first control signals, one or more second control signals, and generating, based at least on the one or more second control signals, the one or more response outputs, wherein the one or more response outputs are configured to advance a conversation toward one or more end-goals;

determining, based at least on the one or more response outputs, one or more electronic messages to generate;

generating the one or more electronic messages to be conveyed, via one or more communication networks, to a computing device, wherein the one or more electronic messages are in response to the inquiry; and updating, based at least on the one or more response outputs, a customer relationship management platform.

2. The system of claim 1, wherein the operations further comprise receiving one or more rankings of the one or more end-goals, wherein a first end-goal of the one or more end-goals is associated with a higher ranking than a second end-goal of the one or more end-goals.

3. The system of claim 1, wherein the front-end template is selected from a plurality of front-end templates in a front-end template library, and wherein the logic tree is selected from a plurality of logic trees in a logic tree library.

4. The system of claim 1, wherein the operations further comprise managing any post-interaction events based at least on the one or more response outputs.

5. The system of claim 1, wherein the operations further comprise updating the customer relationship management platform by at least inserting an indication of an appointment with a user associated with the inquiry into the customer relationship management platform.

6. The system of claim 1, wherein the operations further comprise:

parsing the inquiry to generate a parsed inquiry;

conveying the parsed inquiry to a large language model artificial intelligence agent; and receiving, from the large language model artificial intelligence agent, a first indication of the topic and one or more second indications of one or more objects of the parsed inquiry.

7. A computer-implemented method comprising:

classifying, by a conversational artificial intelligence agent in a first dialogue state, an inquiry to generate a classified inquiry;

determining, by the conversational artificial intelligence agent and based at least on one or more parameters extracted from the classified inquiry, a second dialogue state to transition to from the first dialogue state, wherein the one or more parameters comprise a topic and an object of the inquiry;

determining, based at least on the one or more parameters and based at least on the second dialogue state, one or more response outputs to generate, wherein determining the one or more response outputs further comprises conveying the one or more parameters to a front-end template, generating, by the front-end template, one or more first control signals to be conveyed to a logic tree, wherein the one or more first control signals are coupled to one or more conditional nodes within the logic tree, generating, by the logic tree and based at least on the one or more first control signals, one or more second control signals, and generating, based at least on the one or more second control signals, the one or more response outputs, wherein the one or more response outputs are configured to advance a conversation toward one or more end-goals;

determining, based at least on the one or more response outputs, one or more electronic messages to generate based at least on the one or more response outputs;

generating the one or more electronic messages to be conveyed, via one or more communication networks, to a computing device, wherein the one or more electronic messages are in response to the inquiry; and updating, based at least on the one or more response outputs, a customer relationship management platform.

8. The computer-implemented method of claim 7, further comprising receiving one or more rankings of the one or more end-goals, wherein a first end-goal of the one or more end-goals is associated with a higher ranking than a second end-goal of the one or more end-goals.

9. The computer-implemented method of claim 7, wherein the front-end template is selected from a plurality of front-end templates in a front-end template library, and wherein the logic tree is selected from a plurality of logic trees in a logic tree library.

10. The computer-implemented method of claim 7, further comprising managing any post-interaction events based at least on the one or more response outputs.

11. The computer-implemented method of claim 7, further comprising updating the customer relationship management platform by at least inserting an indication of an appointment with a user associated with the inquiry into the customer relationship management platform.

12. The computer-implemented method of claim 7, further comprising:

parsing the inquiry to generate a parsed inquiry;

conveying the parsed inquiry to a large language model artificial intelligence agent; and receiving, from the large language model artificial intelligence agent, a first indication of the topic and one or more second indications of one or more objects of the parsed inquiry.

13. A non-transitory computer readable medium storing instructions, which when executed by at least one data processor, result in operations comprising:

classifying, by a conversational artificial intelligence agent in a first dialogue state, an inquiry to generate a classified inquiry;

determining, by the conversational artificial intelligence agent and based at least on one or more parameters extracted from the classified inquiry, a second dialogue state to transition to from the first dialogue state, wherein the one or more parameters comprise a topic and an object of the inquiry;

determining, based at least on the one or more parameters and based at least on the second dialogue state, one or more response outputs to generate, wherein determining the one or more response outputs further comprises conveying the one or more parameters to a front-end template, generating, by the front-end template, one or more first control signals to be conveyed to a logic tree, wherein the one or more first control signals are coupled to one or more conditional nodes within the logic tree, generating, by the logic tree and based at least on the one or more first control signals, one or more second control signals, and generating, based at least on the one or more second control signals, the one or more response outputs, wherein the one or more response outputs are configured to advance a conversation toward one or more end-goals;

determining, based at least on the one or more response outputs, one or more electronic messages to generate based at least on the one or more response outputs;

generating the one or more electronic messages to be conveyed, via one or more communication networks, to a computing device, wherein the one or more electronic messages are in response to the inquiry; and updating, based at least on the one or more response outputs, a customer relationship management platform.

* * * * *